US010528036B2

(12) United States Patent
Ryznar et al.

(10) Patent No.: US 10,528,036 B2
(45) Date of Patent: Jan. 7, 2020

(54) LIGHT GUIDED ASSEMBLY SYSTEM AND METHOD

(71) Applicant: OPS Solutions LLC, Wixom, MI (US)

(72) Inventors: Paul Ryznar, Northville, MI (US); James Ryznar, Belleville, MI (US)

(73) Assignee: OPS Solutions LLC, Wixom, MI (US)

( * ) Notice: Subject to any disclaimer, the term of this patent is extended or adjusted under 35 U.S.C. 154(b) by 70 days.

(21) Appl. No.: 15/600,054

(22) Filed: May 19, 2017

(65) Prior Publication Data

US 2017/0255186 A1   Sep. 7, 2017

Related U.S. Application Data

(63) Continuation of application No. 13/984,744, filed as application No. PCT/US2012/024730 on Feb. 10, 2012, now Pat. No. 9,658,614.
(Continued)

(51) Int. Cl.
   *G05B 19/418* (2006.01)

(52) U.S. Cl.
   CPC ..... *G05B 19/418* (2013.01); *G05B 19/41805* (2013.01); *G05B 2219/31027* (2013.01);
   (Continued)

(58) Field of Classification Search
   CPC ............ G05B 19/418; G05B 19/41805; G05B 2219/31046; G05B 2219/31027;
   (Continued)

(56) References Cited

U.S. PATENT DOCUMENTS 2,682,117 A   6/1954   Wales
3,600,785 A   8/1971   Cook
(Continued)

FOREIGN PATENT DOCUMENTS

DE   10320557 A1   12/2004

OTHER PUBLICATIONS

Written Opinion of the International Searching Authority for International Application No. PCT/US2012/024730 completed Jun. 14, 2012.
(Continued)

*Primary Examiner* — Christopher E. Everett
(74) *Attorney, Agent, or Firm* — Gardner, Linn, Burkhart & Ondersma LLP

(57) ABSTRACT

A guide system and method of projecting visual indicators onto a physical object to guide actions of an individual comprises providing a guide system having a guide system controller and a projector, with the guide system controller including a plurality of addressed display features. An input signal is provided to the guide system controller whereby an addressed display feature is selected based on the input signal and the projector projects a visual indicator corresponding to the selected addressed display feature onto a physical object. The guide system controller may also include a plurality of positional identifiers, with the method including the selecting of a positional identifier based on the input signal and the projecting of the visual indicator onto a physical object at a location corresponding to the selected positional identifier.

12 Claims, 14 Drawing Sheets

Related U.S. Application Data

(60) Provisional application No. 61/441,897, filed on Feb. 11, 2011.

(52) U.S. Cl.
CPC .............. *G05B 2219/31046* (2013.01); *G05B 2219/32001* (2013.01); *G05B 2219/35494* (2013.01); *Y02P 90/04* (2015.11)

(58) Field of Classification Search
CPC ........... G05B 2219/35494; G05B 2219/32001; Y02P 90/04
See application file for complete search history.

(56) References Cited

U.S. PATENT DOCUMENTS

| | | | |
|---|---|---|---|
| 3,623,066 A | 11/1971 | Norris | |
| 3,667,104 A | 6/1972 | Chamillard et al. | |
| 3,986,244 A | 10/1976 | Latanzi | |
| 4,102,568 A | 7/1978 | Miyagi | |
| 4,163,309 A | 8/1979 | Stuckler | |
| 4,222,036 A | 9/1980 | Troukens | |
| 4,469,553 A | 9/1984 | Whitehead | |
| 5,341,183 A | 8/1994 | Dorsey-Palmateer | |
| 5,406,176 A | 4/1995 | Sugden | |
| 6,000,801 A | 12/1999 | Dillon et al. | |
| 6,036,319 A | 3/2000 | Rueb et al. | |
| 6,170,163 B1 | 1/2001 | Bordignon et al. | |
| 6,317,980 B2 | 11/2001 | Buck, III | |
| 6,600,476 B2 | 7/2003 | Mathis et al. | |
| 7,193,696 B2 | 3/2007 | Engelbart et al. | |
| 7,241,981 B2 | 7/2007 | Hofmann | |
| 7,268,893 B2 | 9/2007 | Palmateer | |
| 7,292,269 B2 | 11/2007 | Raskar et al. | |
| 7,306,339 B2 | 12/2007 | Kaufman et al. | |
| 7,307,542 B1 * | 12/2007 | Chandler | H05B 37/0254 340/12.31 |
| 7,433,796 B2 | 10/2008 | Behan et al. | |
| 7,463,368 B2 | 12/2008 | Morden et al. | |
| 7,515,981 B2 | 4/2009 | Ryznar et al. | |
| 7,576,727 B2 * | 8/2009 | Bell | G06F 3/011 345/156 |
| 8,027,745 B1 * | 9/2011 | Freeze | G06Q 10/06 700/106 |
| 8,751,049 B2 | 6/2014 | Linder et al. | |
| 2004/0111901 A1 | 6/2004 | Newcomer | |
| 2005/0154431 A1 | 7/2005 | Quistgaard et al. | |
| 2005/0225753 A1 * | 10/2005 | Engelbart | B29C 70/384 356/237.1 |
| 2006/0059699 A1 | 3/2006 | Krantz et al. | |
| 2006/0106483 A1 | 5/2006 | Behan et al. | |
| 2006/0185181 A1 | 8/2006 | Long et al. | |
| 2007/0180674 A1 | 8/2007 | Morden et al. | |
| 2008/0121168 A1 * | 5/2008 | Ryznar | G05B 19/41805 116/201 |
| 2011/0178627 A1 * | 7/2011 | Wechter | G05B 19/41875 700/109 |

OTHER PUBLICATIONS

International Search Report and Written Opinion of the International Searching Authority for International Application No. PCT/US2006/39215, dated Jun. 1, 2007.
Search Report issued by the European Patent Office for European Application No. 12744452.9 dated Jul. 24, 2015.
Assembly Guidance System Inc.'s Laserguide brochure, publication date unknown.
Assembly Guidance System Inc.'s Laserguide Productivity and Flexibility brochure, publication date unknown.
Assembly Guidance System Inc.'s About Laser Projection Webpage, indicated to have been published Nov. 2004.
Thesis entitled, LuminAR: A Compact and Kinetic Projected Augmented Reality Interface by Natan Linder, dated Aug. 12, 2011.
Article entitled, Towards Optimal Worker Assistance: A Framework for Adaptive Selection and Presentation of Assembly Instructions by A. Bannat et al., dated 2008.
Technical Paper entitled, Improving Manual Manufacturing with a Computer Based Laser Projection System by Scott Blake, dated Oct. 25-27, 1993.
Article entitled, Laser Guides Manual Assembly by Arthur Browne, dated 1991.
Article entitled, Laser Projection Links Composite Design to Manual Fabrication by E. D. Ledbetter, understood to have been published in 1999.

* cited by examiner

Pre-assemble
> <
FIG. 1A
Select
FIG. 1B
Insert
FIG. 1C
Assemble
FIG. 1D
Pick
FIG. 1E
Gauge
FIG. 1F
Torque
FIG. 1G
← Left
FIG. 1H
Right →
FIG. 1I
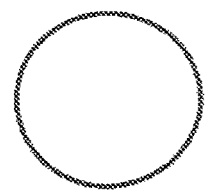
FIG. 1J
FIG. 1K
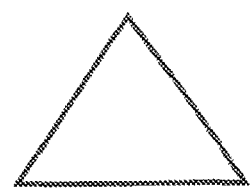
FIG. 1L
Prior Art

LIGHT GUIDED ASSEMBLY SYSTEM AND METHOD

CROSS REFERENCE TO RELATED APPLICATION

The present application is a continuation of U.S. application Ser. No. 13/984,744, filed Aug. 9, 2013, which is a U.S. national stage application and claims the benefit of International Patent App. PCT/US2012/024730, filed Feb. 10, 2012, which claims priority of U.S. provisional application, Ser. No. 61/441,897 filed Feb. 11, 2011, by Paul Ryznar and James Ryznar for LIGHT GUIDED ASSEMBLY SYSTEM, which are hereby incorporated herein by reference in their entireties.

BACKGROUND OF THE INVENTION

The present invention is directed to improvements in a system for guiding an individual in the performance of operational steps, and in particular a system that provides visual indicators to the individual.

U.S. Pat. No. 7,515,981 provides a LIGHT GUIDED ASSEMBLY SYSTEM for aiding human actions. Numerous activities involve the performance of pre-designated operational steps to properly complete a particular task, with some such activities needing to be completed within a specified or standard time allowance. Problems arise when such activities are improperly performed either from a workmanship standpoint and/or outside the standard time allowance, both of which add significant and undesirable cost and complexity to the manufacturing operations. In the case of failure to meet a standard time allowance, an entire assembly process may become unbalanced resulting in costly bottlenecks and excess inventory.

In addition to manufacturing assembly operations, numerous other activities involve human performance of particular tasks that are desired to be performed without omitting any steps.

SUMMARY OF THE INVENTION

The present invention provides a guide system adapted to provide visual indicators to an individual to guide actions.

According to an aspect of the present invention, a method of projecting visual indicators onto a physical object to guide actions of an individual comprises providing a guide system having a guide system controller and a projector, with the guide system controller including a plurality of addressed display features. The method further comprises providing an input signal to the guide system controller, selecting an addressed display feature based on the input signal, and projecting a visual indicator corresponding to the selected addressed display feature onto a physical object. The guide system controller may further include a plurality of positional identifiers with the method further comprising selecting a positional identifier based on the input signal, and projecting a visual indicator corresponding to the selected addressed display feature onto a physical object at a location corresponding to the selected positional identifier.

The guide system controller may be interfaced with a manufacturing execution system (MES), wherein the input signal is provided to the guide system controller from the manufacturing execution system. Alternatively or additionally, the guide system controller may be interfaced with a system controller that controls the operation of an automated process, wherein the input signal is provided to the guide system controller from the system controller. The system controller may be a programmable logic controller and receive signals from a sensor apparatus, wherein the input signal is provided to the guide system controller based on signals received by the system controller from the sensor apparatus. The system controller may be interfaced with a manufacturing execution system. Either the manufacturing execution system and/or the system controller may receive signals from a sensor apparatus, or receive manually input signals, with such signals comprising or deriving an input signal to the guide system controller prompting the projection of a visual indicator.

The method may further comprise the providing of a confirmation signal to the guide system controller in response to completion of an action by an individual based on the visual indicator. A sensor apparatus may be provided that is operable to detect completion of the action, with the sensor apparatus generating a confirmation signal.

The guide system may further include a camera operable to image at least one of actions of an individual guided by the visual indicator and the visual indicator, with the method further including recording images while an operator is guided by the guide system and/or recording the time duration while an operator is guided by the guide system. Simultaneously recorded images and recorded time durations may be displayed, such as on a monitor, for evaluating process improvements.

A guide system for providing visual indicators to an individual to guide actions in accordance with an aspect of the invention comprises at least one directional light device selectively operable to project and target at least one indicating light, a guide system controller including a plurality of programmed addressed display features and a plurality of programmed positional identifiers. The guide system controller receives an input signal and causes the directional light device to project a visual indicator corresponding to an addressed display feature onto a physical object at a location corresponding to a positional identifier based on the input signal.

The guide system controller may be interfaced with a manufacturing execution system to provide the input signal to the guide system controller, or may be interfaced with a system controller that controls the operation of an automated process to provide the input signal to the guide system. Both the manufacturing execution system and a system controller, such as a programmable logic controller, may receive signals from a sensor apparatus, wherein the input signal is provided to the guide system controller based on the signals received by the manufacturing execution system and/or the system controller from the sensor apparatus. The system controller may be interfaced with a manufacturing execution system.

A camera operable to image the actions of an individual guided by a visual indicator or a visual indicator itself may be included in the guide system where a controller, such as the guide system controller, records images and time durations while an operator is guided. A monitor interfaced with the guide system controller may be used to view recorded images and time durations.

Still further, a guide system adapted to provide visual indicators to an individual to guide actions in accordance with the present invention comprises a guide system controller, a projector selectively operable to project and target a visual indicator, and a camera operable to image at least one of actions of an individual guided by the visual indicator or the visual indicator. The guide system controller receives an input signal and causes the projector to project a visual indicator onto a physical object based on the input signal with the guide system controller recording images and time durations while an individual is guided by the visual indicator, which recorded images and time durations may be viewable on a monitor. The guide system controller may include a plurality of programmed addressed display features and a plurality of programmed positional identifiers, wherein the guide system controller causes the projector to project the visual indicator corresponding to an addressed display feature onto a physical object at a location corresponding to a positional identifier based on the input signal.

A motion sensor may be incorporated with any of the guide systems, with the motion sensor detecting three dimensional spatial motion of an individual, a product, or a workstation process guided by a visual indicator. The motion sensor may output a confirmation signal when the three dimensional spatial motion detected by the motion sensor complies with a desired action, where the confirmation signal may be transmitted to the guide system controller and/or other controllers.

According to another aspect of the invention, a guide system adapted to provide visual indicators to an individual to guide sequential actions comprises an operational guide system interfaced with an operational software system or manufacturing execution system, with the operational guide system comprising at least one directional light device selectively operable to project and target at least one indicating light and a controller, with the controller receiving input signals and selectively providing command signals to the directional light device in response to the input signals wherein the projection of the indicating light is indicative of the command signal. The operational software system being operable to provide data inputs to the operational guide system that comprise input signals to the controller. The controller may be programmed with a plurality of addressed display features and a plurality of programmed positional identifiers, where the controller receives an input signal and causes the directional light device to project a visual indicator corresponding to an addressed display feature onto a physical object at a location corresponding to a positional identifier based on the input signal.

The indicating light may create a human readable display image based on the data inputs, and may comprise numbers, words, alphanumeric characters, a drawing image and/or a video image. The data inputs may alternatively or additionally direct the projection location of the indicating lights. The operational guide system may further include a sensor apparatus that is operable to detect operation information and generate an output indicative of the operation information. Conditional programming can also be employed to redirect an operator to a different set of process steps dependent on the outcome of prior steps as determined by the operator, controller, confirmation devices, and/or computer MES system or the like.

According to another aspect of the invention, an operational guide system adapted to provide visual indicators to an individual to guide sequential actions comprises at least one directional light device, a guide system controller, and a camera. The directional guide light device being selectively operable to project and target at least one indicating light for guiding actions of an individual and the guide system controller receiving an input signal and selectively providing a command signal to the directional light device in response to the input signal, wherein the projection of the indicating light is indicative of the command signal. The camera is operable to image the actions of an individual guided by the operational guide system and/or the impingement of the indicating light on an object. Images recorded by the camera can be viewed in combination with recorded cycle time data to review the recorded process steps and determine corrective actions to optimize the process and/or reduce cycle times.

In particular embodiments the camera may be a video camera. A monitor may be interfaced with the guide system controller such that images take by the camera are viewable on the monitor. A light controller may be interfaced with the guide system controller for providing input signals to the guide system controller for operatively controlling the projection of the indicating light. A camera controller may also be interfaced with the guide system controller, with the camera controller being operable to control the zoom, viewing position, and/or focus of the camera. Still further, a computer may be interfaced with the guide system controller, such as a distally located computer, with the images taken by the camera being viewable on a monitor of the computer. The computer may also be operable to provide input signals to the guide system controller for operatively controlling the projection of the indicating light and/or the zoom, viewing position, and/or focus of the camera.

According to yet another aspect of the invention, an operational guide system adapted to provide visual indicators to an individual to guide sequential actions includes a projection surface having a front surface and a rear surface opposite the front surface. A directional light device selectively projects and targets at least one indicating light on the rear surface of the projection surface to create display images on the projection surface, wherein the display images are viewable by an individual viewing the front surface of the projection surface to guide actions of the individual.

According to another aspect of the invention, an operational guide system adapted to provide visual indicators to an individual to guide sequential actions comprises at least one directional light device, a guide system controller, and a motion sensor. The directional guide light device being selectively operable to project and target at least one indicating light for guiding actions of an individual and the guide system controller receiving an input signal and selectively providing a command signal to the directional light device in response to the input signal, wherein the projection of the indicating light is indicative of the command signal. The motion sensor detects three dimensional spatial motion, such as of the individual, product, or workstation process being guided by the indicating light.

In particular embodiments, the three dimensional spatial motion of the individual detected by the motion sensor comprises a confirmation signal when the detected motion complies with a desired action. For example, the three dimensional spatial motion of the individual detected by the motion sensor may be transmitted to the guide system controller for comparison with the desired action.

The operational guide system of the present invention is thus readily programmable and adaptable to provide a cost effective and accurate method of guiding an individual through a series of tasks and may also provide confirmation that the tasks have been fully completed in the proper order, as well as additional information regarding cycle times and images recorded during operations.

These and other objects, advantages, purposes, and features of this invention will become apparent upon review of the following specification in conjunction with the drawings.

BRIEF DESCRIPTION OF THE DRAWINGS

FIGS. 1A-1L illustrate exemplary images that may be projected by the light sources of the assembly guide system of FIG. 1;

DESCRIPTION OF THE PREFERRED EMBODIMENTS

The present invention is directed toward advances in an operational light guide system that projects lights to guide actions by one or more individuals, such as the operational guide system disclosed in U.S. Pat. No. 7,515,981, which is hereby incorporated by reference.

Figure 1:
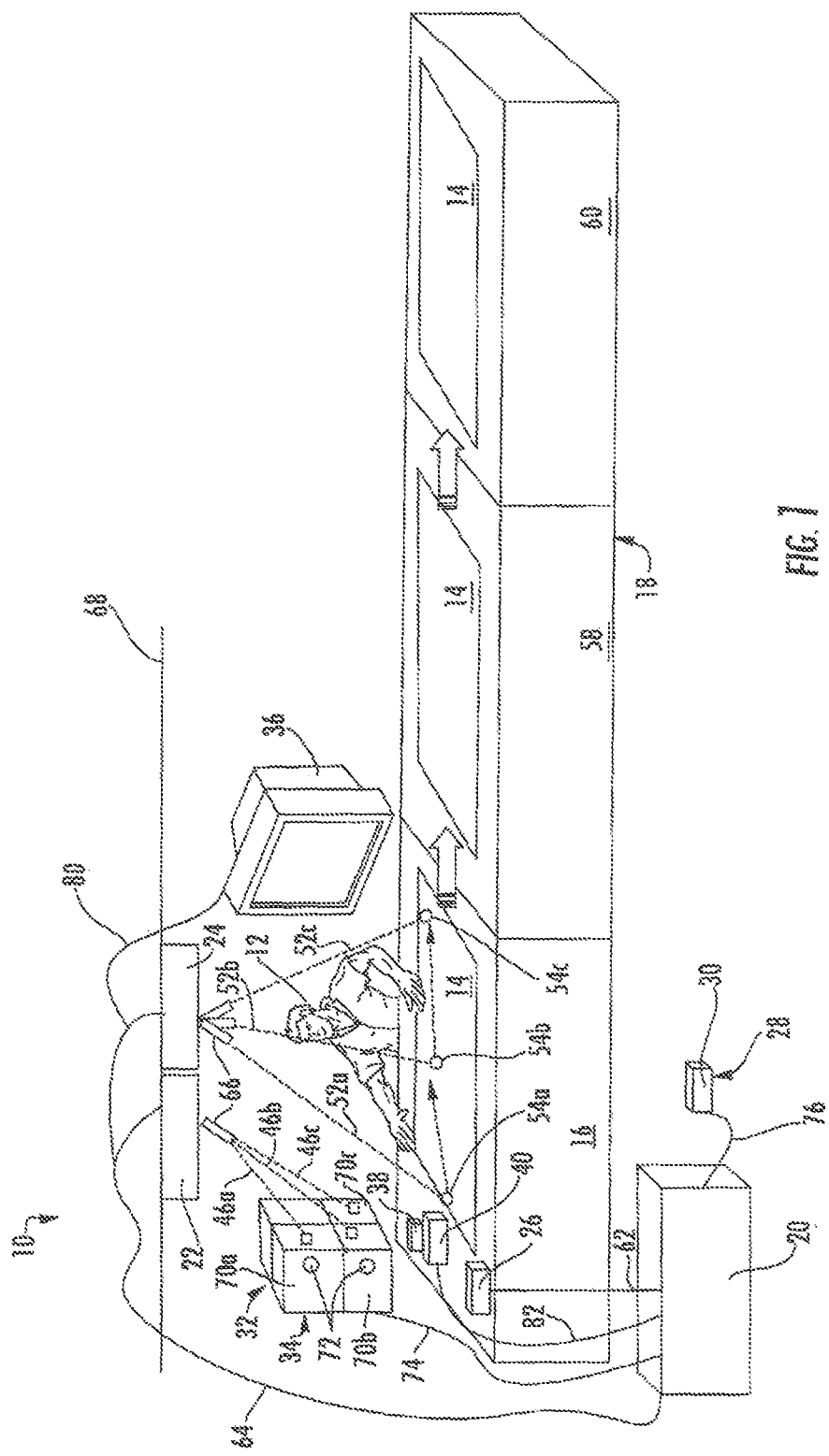
FIG. 1 is a perspective view of an operational guide system constructed as an assembly guide system at a work station of an assembly line.
Figure 2:
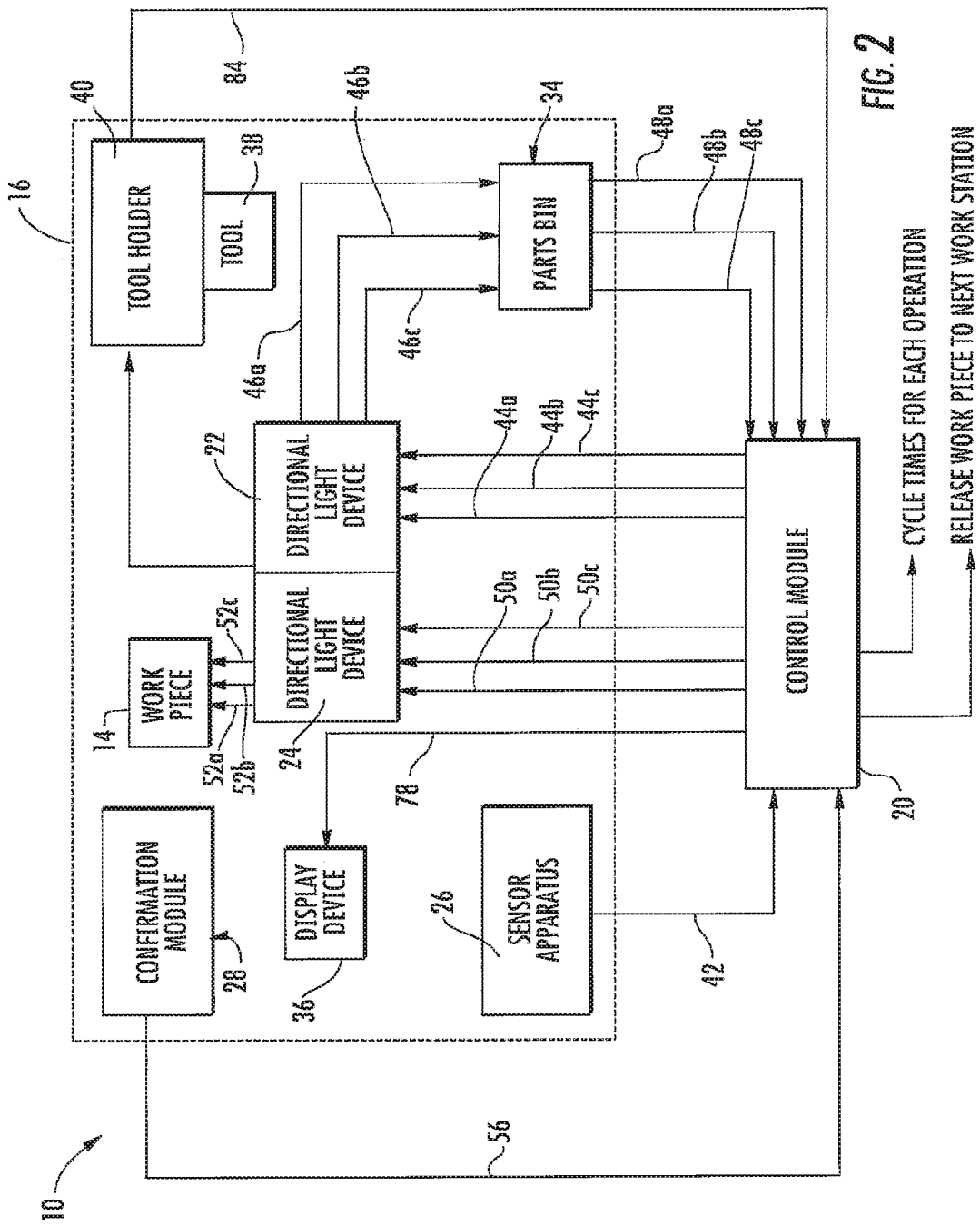
FIG. 2 is a schematic illustration of the operation of the assembly guide system of FIG. 1.

With reference to FIGS. 1-2, U.S. Pat. No. 7,515,981 discloses an operational guide system or guide system 10 in connection with the providing of visual indicators to an operator 12 performing one or more assembly actions on a work piece 14 at a work station 16 of an assembly line 18. The illustrated guide system 10 includes a controller or a control module 20, two directional light devices 22, 24, a sensor apparatus 26, and a confirmation module or device or element 28, shown as a foot pedal 30. Guide system 10 includes a component location 32, which is illustrated as a parts bin 34, a display device 36, and a tool 38 and tool holder 40.

Guide system 10 is operable, in response to an operation information or characteristic or identification information associated with work piece 14 detected by sensor apparatus 26, to selectively provide indicating lights 46, 52 to guide an operator in the selection and/or assembly of parts to work piece 14, with the indicating lights 46, 52 being directed and/or provided based on, at least in part, the operation information detected by sensor apparatus 26. The system 10 is also or alternatively operable in response to one or more confirmation signals, such as confirmation signals 48, 56, and/or 84 of FIG. 2 that are described below, which may be manually or automatically supplied to control module 20 to verify completion of a particular operation or task. The system 10 is further operable via display device 36 to provide and relay information to operator 12 such as, for example, a listing of steps needing completion, work instructions, images of a work piece, videos, and/or warnings regarding a missed or improperly performed assembly step.

Referring to FIGS. 1 and 2, when work piece 14 initially enters work station 16, the sensor apparatus 26 detects an operation information or characteristic or identification information associated with the work piece 14, such as, for example, the presence of and/or the type of work piece 14 present at the work station 16. In response to the detection by sensor apparatus 26, a first input signal 42 is communicated or transmitted to the control module 20 and, based on the detected or identified work piece 14 that the operator 12 is or will be working on, the control module 20 communicates or transmits a command signal 44 (FIG. 2) to directional light device 22 to project an indicating light 46 at a location on parts bin 34 to guide the operator 12 to a part required for a particular step in the assembly action. After the proper part has been selected, a confirmation signal 48 (FIG. 2) is sent to the control module 20, the control module 20 then transmits a command signal 50 (FIG. 2) to directional light device 24 to project indicating light 52 to indicate the operational step location 54 on the work piece 14 where the selected component is to be installed. Upon completion of a particular operation step, the operator 12 actuates the foot pedal 30 to transmit a confirmation signal 56 (FIG. 2) to the control module 20 verifying that the operation step has been completed. The control module 20 may then send another command signal 49, 50 to one of the directional light devices 22, 24 to indicate the next operation step, or may release the work piece 14 to a subsequent work station 58, 60 for further operations if all required pick and assembly steps have been properly completed.

Guide system 10 is able to provide visual indicators to operator 12 that are specific to a particular work piece 14 such that, for example, multiple different styles or types of work pieces requiring different components or parts may be processed at work station 16 with a significant reduction in the risk of the occurrence of assembly errors. The assembly guide system 10 thus provides a cost effective and accurate method of guiding an operator 12 through a series of tasks and provides confirmation that the tasks have been fully accomplished and completed in the proper order. The control module 20 may also be used to monitor cycle times of the individual operational steps and combined operations undertaken at the work station 16 for system productivity reporting, or the like.

Assembly guide system 10 is shown in FIG. 1 in connection with work station 16, where work station 16 is part of an assembly line 18 that includes additional work stations 58, 60 for performing subsequent operations. Additional assembly guide systems could be included at the other work stations of assembly line, or a single assembly guide system could be used to aid operations at more than one work station.

As noted, sensor apparatus 26 functions to detect an operation information or characteristic or identification information associated with work piece 14, such as the presence and/or type of work piece 14 located at the work station 16, and may be constructed as one or more of a number of known sensors such as, for example, a proximity switch, light curtain, photo eye, radio frequency identifier device, bar code reader, or the like. When constructed as a radio frequency identifier device or bar code reader, a readable tag or bar code may be placed on either the work piece or the structure upon which the work piece is supported while traveling on the assembly line. The tag or bar code may contain information regarding the type of work piece at the work station, such as the model of the work piece, measurements related to the work piece, or the type of components required. A scanner or reader may be handheld by the operator or mounted to the assembly line, with the scanner being able to read the information from the tag or bar code when the work piece enters the work station. Alternatively, a sensor apparatus may comprise a vision system configured to detect an identifiable characteristic or identification information associated with a work piece. Guide system 10 may alternatively be activated or sequentially stepped to subsequent operations by non-automated signals. For example, an operator may manually enter a part type into the system, depress a palm button, press a touch screen, or simply commence operations or pre-operations on a part.

The type of part present at a particular work station need not be determined using a bar code or radio frequency system. For example, and as is known in the art, standard binary type sensors or cameras may be used to detect geometrically distinguishing features of a work piece or the structure upon which it is located to "identify" the work piece. Still further, an assembly guide system could be constructed where an operator uses a hand held scanner to scan a bar code label affixed to the work piece or the structure supporting the work piece as opposed to the scanner being mounted directly to the assembly line. The sensor apparatus may also be used to detect the relative orientation of a work piece with respect to the work station, with the control module adapted to receive the positional information and provide accordingly adjusted command signals to the directional light devices such that the projected indicating lights accurately impinge on the desired operational step locations. Still further, the presence of a part at a work station may be supplied to the operational guide system by a manual operator activated input signal, such as by a touch screen, a palm button, or the like.

Control module 20, in the illustrated embodiment, is a computer controller device and as indicated is adapted to receive and send various signals to monitor and guide the assembly actions at work station 16. Control module 20 may be constructed as a desktop or laptop style PC, a PLC, or the like, or may be a networked computer system that may be used to control and monitor other aspects of the assembly line and work stations.

As previously indicated, control module 20 is adapted to receive a first input signal 42 regarding identification information of the work piece present at the work station. In the illustrated embodiment of FIG. 1, the first input signal 42 is transmitted to the control module 20 directly from the sensor apparatus 26 along communication link 62, where link 62 is a computer cable, fiber optic line, or the like. Alternatively, however, a first input signal may be transmitted to a network computer system and, in response to the first input signal, the network system may provide the control module with the identification information regarding the work piece present at the work station. The identification information, as previously indicated, may simply indicate the presence of a part at the work station and/or may include information regarding the type of work piece at the work station, such as the model of the work piece, measurements related to the work piece, or the type of components required. Optionally, a sensor apparatus and control module may be alternatively constructed to wirelessly transmit and receive identification information.

In response to the first input signal 42 received, the control module 20 outputs command signals 44, 50 to directional light devices 22, 24 along link 64 to provide visual indicators to the operator, as described in more detail below, with the command signals 44, 50 being communicated based on, at least in part, the first input signal 42. In the illustrated embodiment, two substantially similar directional light devices 22, 24 are provided at work station 16 and are responsive to the command signals 44, 50 of the control module 20. Directional light device 22 is used to project indicating lights 46 at the component location 32, while the other directional light device 24 is used to project indicating lights 52 at operational step locations 54 on work piece 14. Each directional light device 22, 24 includes a light source 66 for projecting indicating lights 46, 52, with the directional light devices 22, 24 constructed such that the indicating lights 46, 52 may be selectively and movably positionable to direct the indicating light 46, 52 at pre-targeted locations. The light sources 66 may also be constructed to provide an indicating light beam of selectively adjustable brightness to compensate for ambient surroundings and/or the distance from the light source to the selected impingement point. Although light sources 66 are illustrated in FIG. 1 as projecting a single indicating light beam, it should also be appreciated that light sources 66 may be constructed to simultaneously project two or more beams such that, for example, multiple parts may be indicated for selection from location 32 by the operator 12 or multiple assembly locations may be indicated.

Light sources 66 may be constructed as laser light sources that are able to project a focused, coherent beam of light at a desired location. Laser light sources may preferably be class 3 or lower lasers for employment within a visual setting for operators. Alternatively, light sources other than lasers may be used and still function as intended, such as standard projectors, incandescent lights, light emitting diodes (LEDs), or the like.

Light sources 66 may be constructed such that they produce light of differing color from each other to provide further visual cues to the operator 12 while working at work station 16. Furthermore, light sources may be adapted to project animated images or videos onto a surface, such as a surface of the work piece 14, assembly line 18, or a work station 16, 58, 60. The projected animated images or videos may be, for example, a training video, and may be in a .mpeg, .wmv, or other such file format provided by or stored in, for example, a control module of an operational guide system.

Referring to FIGS. 1A-1L, the directional light devices 22, 24 may also include known optical effect devices for fanning or adapting or configuring the projected indicating lights 46, 52 produced by the light sources 66 into a desired shape, pattern, or form at the point or location at which the indicating light 46, 52 impinges the component location 32 or operational step location 54. For example, the indicating light may initially be projected as a geometric shape (FIGS. 1J-1L), such as a circle, about a particular location to quickly attract the operator's attention, and then focus to a point or circle of smaller diameter at the specific location. The indicating light may also be projected to produce alpha numeric characters, such as shown in FIGS. 1A-1I, blink, and/or produce rotating images. For example, sequential numbers may be projected where each number indicates a step in the assembly action being preformed by the operator at the work station, or part numbers or textual information may be projected to provide written guidance to the operator. Indicating lights projected by light sources, as described in more detail below, may further be configured to display videos or pictures or animation on the surface upon which the indicating light impinges. The configured images form a type of display graphic or visual display feature ("VDF") exhibited by an indicating light, such as indicating light 46 or 52, when projected onto a surface, with FIGS. 1A-1L representing exemplary display graphics or VDFs.

As previously noted, indicating lights 46, 52 may be projected at component location 32 or at operation step locations 54 associated with work piece 14. Component location 32 is exemplified as a parts bin 34 having multiple storage locations 70 for holding various parts required in the assembly of work pieces 14. As shown, directional light device 22 is functional to selectively project an indicating light 46 at discrete storage locations 70 of parts bin 34 in response to command signal 44 to prompt the operator 12 regarding part selection.

RFID tags, or the like, may also be used to supply information to the control module 20. For example, an RFID tag located on a parts bin 34 may be used in connection with assembly guide system 10 for monitoring the presence and/or proper location of the parts bin 34. In the event assembly guide system 10 detected, such as by control module 20, the absence of parts bin 34 an error message could be, for example, displayed by display device 36, or projected by a light device 22, 24, or an audible warning message may be broadcast.

In the illustrated embodiment of FIG. 1, storage locations 70 of parts bin 34 include detection devices 72 that are intended to detect or sense when a component has been withdrawn from a particular storage location 70. Detection devices 72 may be of known construction and are selected based on a particular application, taking into consideration the types or models of work pieces 14 and parts to be assembled. Detection devices 72, for example, may comprise light curtains, proximity sensors, electronic mats, such as pressure sensitive mats, machine vision systems, or the like.

The detection devices 72 are operable to transmit a confirmation signal 48 to the control module 20 along link 74 upon selection by the operator 12 of a part from a particular storage location 70, with control module 20 being functional to determine whether or not the operator 12 has selected the correct part as prompted. In response to the confirmation signal 48, if the operator 12 selected the proper part as directed by the indicating light 46, control module 20 may terminate the indicating light 46 projecting from directional light device 22 at the storage location 70 and transmit a subsequent command signal 50 to directional light device 24 to project an indicating light 52 to the operational step location 54 on the work piece 14 where the just selected part is to be assembled. However, if control module 20 determines that an incorrect part has been selected as compared to what should have been selected as prompted by the indicating light 46, control module 20 will not provide the subsequent command signal 50. In addition, control module 20 may be constructed to provide a visual or audible signal to the operator 12 when an improper part has been selected from a storage location 70.

Although not illustrated, the parts bin may additionally employ a known pick-to-light system whereby each storage location includes an illumination device, such as an LED light or the like, that lights up to prompt the operator as to the proper storage location from where a part is to be selected. When the assembly guide system includes such a pick-to-light system, the directional light device 24 used to project an indicating light 46 at a component location 32 may optionally be excluded.

As noted above, assembly guide system 10 includes confirmation module 28, which in the illustrated embodiment is a foot pedal 30. Confirmation module 28 is constructed to transmit a confirmation signal 56 along link 76 to control module 20 to signal that the operational step indicated by directional light device 22 or 24 has been completed. To transmit the confirmation signal 56, operator 12 simply depresses foot pedal 30 upon completion of the directed activity. The confirmation signal 56 transmitted by foot pedal 30 then triggers control module 20 to selectively transmit another command signal 44, 50 to provide guidance to the operator 12 regarding the subsequent operational step that must be taken by the operator 12 at the work station 16 in accordance with work piece 14. For example, the assembly guide system 10 may cause an indicating light 46 to be projected at a storage location 70 for the next required part. Alternatively, the control module 20 may provide a command signal that releases the work piece to the next work station 58 if all of the operational steps at the current work station 16 have been completed.

Although illustrated as a foot pedal 30, it should be understood that numerous alternative confirmation modules 28 may be utilized. For example, confirmation module 28 may be constructed as a pressure sensitive mat, push button, toggle switch, palm button, light curtain, touch screen, touch pad, part present sensor or the like, which is constructed to be depressed, switched, or otherwise activated by a manual action of the operator 12. A sound activated signal may alternatively be employed, such as a voice command, to provide a confirmation signal. Confirmation module 28 may also be constructed as a wireless transmitter, thereby eliminating the need for a physical link. Further, operational guide system may be adapted to receive and/or respond to other confirmation signals and/or sources as additional technologies become available.

Still further, a confirmation module or device or element may be constructed to automatically detect when an operator has completed a manual step. For example, a confirmation module may be constructed as a vision system that is able to detect the presence or absence of a component at a location, such as by processing an image captured by a pixilated imaging device, as is known in the art. Alternatively, for example, the confirmation module may be constructed as a proximity sensor, photo eye, light curtain, or the like, constructed to automatically detect the presence or absence of a part upon assembly to the work piece. Still further, a confirmation signal may be transmitted by an automated tool or measuring device, such as a torque gun, weight scale or other type of measuring device, as described in more detail below. In which case, the automated tool or measuring device may function as a confirmation module. An indicating light projected by a light source of an operational guide system may also be used to provide a confirmation signal where, for example, a sensor is employed at the light source or elsewhere on the operational guide system to detect the reflection of an indicating light from a part or component that requires verification. The light sources may also be used as a "light curtain" by being projected at a particular location or parts bin, or the like, with a sensor adapted to detect that an operator has properly selected from that location.

It should also be appreciated that an operation information could be transmitted to the controller 20 from a remote signal. For example, in the case of a part kitting operation, an order request may be transmitted to a work station from a central processing location, such as a computer system or the like, and transmit a signal to the work station regarding, for example, what parts to gather and/or assemble. In which case, the work piece of the operation may comprise a collection of parts assembled into a parts holder.

Although not illustrated, an assembly guide system may also incorporate known ultrasonic, electromagnetic, and/or similar technology used to confirm, for example, that a tool is placed onto the proper bolt or nut at an assembly operation. Such technology is configured to send and receive ultrasonic frequencies with the spatial location of a sent or received signal being monitored to confirm that an operation is performed at a proper location. Thus, an assembly guide system may be configured to utilize both light sources and ultrasonic, electromagnetic, and or similar technology to confirm assembly or other manual process steps.

Assembly guide system 10 also includes a display device 36 that is able to receive display signals 78 (FIG. 2) along link 80 (FIG. 1) from control module 20 and to relay information to the operator 12. Display device 36 may be constructed as a television, LCD, LED device, or other type of viewable display mechanism. Display device 36 may be used to present information to the operator 12 such as, for example, the sequential steps needing to be performed, work instructions associated with the work station 16, images of a work piece 14 properly affixed with the part that is to be assembled, information regarding a missed or improperly performed assembly step, or the like. In the case of sequential steps, display device 36 may be configured to highlight the current step under consideration and/or provide an indication that previous steps have been completed. The display device 36 may be constructed as a touch screen device adapted to be depressed by an operator to provide a confirmation signal regarding completion of a particular step. The inclusion of such a touch screen device may also provide the ability to prompt or guide an operator through certain operational or assembly steps that do not require guidance via indicating light signals. The display device may also be used to show or provide instructional videos, display running cycle times, desired cycle times, and/or alerts, or the like. In the case of a touch screen, the touching by an operator of a particular location or tab area of the screen may display of a video or an image on the display screen, or another display screen, or may initiate the projection of an indicating light or video.

Optionally, assembly guide system 10 may be used in connection with a tool 38 and a tool holder 40. Tool 38 may comprise, for example, a manual tool such as a wrench, torque wrench, pliers, screwdriver, or the like, or may be an automated tool such as an electric screwdriver, air gun, electric torque wrench, or the like. Tool 38 may otherwise be a manual or automated measuring device such as calipers, a gauge block, feeler gauges, air gauge device, or the like. Tool holder 40 is intended to provide a storage location for tool 38 when tool 38 is not in use. Directional light devices 22, 24 may project an indicating light onto tool 38 and/or tool holder 40 in response to a command signal when tool 38 is required to complete a pending operational step, such as in a similar manner as described above with respect to storage locations 70 of parts bin 34 and operation step locations 54 on work piece 14. Tool holder 40 may include a sensor and thereby be integrated with the assembly guide system 10 to detect when tool 38 is positioned within or removed from tool holder 40, where the sensor may be a photo eye, proximity switch, light curtain, or the like.

Although not illustrated, the assembly guide system may utilize an automated gauge or tool that is electrically linked to control module such that control module is able to monitor both the use of the tool as well as an operational parameter associated with the tool. For example, if a tool is constructed as a torque wrench, the control module may be constructed to monitor the fastening torque obtained by the torque wrench and to compare the value to a preprogrammed or predetermined or threshold value prior to transmitting a subsequent command signal. The control thus may function to transmit the subsequent command signal only after the desired or appropriate torque has been applied by the torque wrench. Similarly, if the tool is constructed as a measuring device, such as digital calipers, control module may be constructed to receive a measurement value, and may compare the measurement value to a threshold measurement value, and may communicate or transmit the subsequent command signal when the measurement value is at or near the threshold measurement value.

Control module 20 is illustrated as transmitting command signal 44a to directional light device 22, which in response to command signal 44a, projects indicating light 46a on storage location 70a of parts bin 34. Upon receiving confirmation signal 48a from detection device 72 signifying that the proper part was selected, control module 20 then terminates projection of indicating light 46a and transmits command signal 50a to directional light device 24 such that indicating light 52a is projected on operational step location 54a on work piece 14 to direct operator 12 as to the proper assembly point for the selected part. Operator 12 then activates foot pedal 30 (or other confirmation device), which transmits confirmation signal 56a to control module 20 and the above process is repeated for indicating lights 46b, 52b, 46c, 52c, storage locations 70b, 70c, and operational step locations 54b, 54c.

As described in more detail below, the control module 20 and directional light devices 22, 24 of the assembly guide system 10 are programmed as to the proper spatial positioning to where an indicating light 46, 52 is to be projected. This teaching of the assembly guide system 10 may be accomplished in various ways. For example, one teaching method involves the use of known pendant device technology, where the pendant device is used to position the projected beam of the light source 66 to a proper location, such as a storage location 70, record the coordinates, and then move to the next location, such as onto the work piece 14. Control module may also be adapted to employ voice activated programming. Alternatively, a wireless transmitter may be used that may be positioned at a desired impingement point of the projected indicating light 46, 52 and functional to transmit the spatial positioning information to the control module. Similarly, various locations, such as part bins, may be provided with wireless transmitters, such as RFID tags, with the control module being adapted to detect the signal and direct the indicating lights accordingly, in which case the operational guide system is able to compensate for movement or shifting of the desired impingement points of the indicating lights. Still further, control module 20 may be directly programmed and, for example, may utilize a touch screen having an image of the work station with the control module 20 being programmable using the touch screen. An operational guide system may also alternatively be programmed via a computer, such as desktop or laptop or networked computer, without the above noted peripheral equipment and using standard hardware such as a mouse to program the control module. The operational guide system may also employ an alignment test pattern that may be used to "calibrate" the system, such as at the beginning of a shift, to insure that the various indicating light signals are properly aimed.

Guide system 10 also includes cycle time monitoring with display device 36 including display fields which may be used to display to an operator the running time or remaining allowable time associated with performance of an operational step, previous running times, average running times, and/or target times for completion of the operational steps. For example, cycle time monitoring display fields may show the cycle time to perform one or more previous or completed operational steps, while cycle time monitoring display field and/or shows the cycle time of the preceding and current operational cycle. A cycle time measurement may, for example, be initiated upon receipt of a first input signal 42 from sensor apparatus 26, and completed upon detection of a confirmation signal 48, 56, 84. Cycle time measurements of given operations or steps may be recorded and statistically reviewed, such as based on longest to shortest duration, and may be viewed remotely from guide system 10, such as by connecting guide system 10 with a networked computer system.

As previously noted, control module 20 may also be used to monitor and record various parameters useful for improving productivity. For example, control module 20 may record cycle times of the individual operational steps at a work station 16 and/or the combined cycle time of operations at a work station 16. Correspondingly, control module 20, or another such computational device, may record and provide charts or reports regarding recorded error data, such as on mis-performed steps, and/or cycle times. In addition, such data may be linked or otherwise networked, or even monitored via the internet, such that the variously above noted cycle times or performance parameters may be monitored from a remote computer, with such data being viewable in a live format or archived.

Although not shown, it should also be appreciated that the operational guide system may be adapted to additionally provide audio guidance and/or instruction, such as voice or sound type instruction.

It should be appreciated that numerous alternative structures and methods are contemplated within the scope of the operational guide system. For example, an operational guide system need only utilize a single directional light device for projecting indicating lights at both a component location as well as operational step locations on a work piece. An operational guide system also need not employ a component location, but rather may employ one or more tools with directional light devices functioning to project indicating lights at the various tools. Furthermore, it should also be appreciated that the assembly guide system 10 of FIGS. 1 and 2 may be alternatively constructed whereby the various links are not formed by computer cables or the like, but are rather formed as wireless connections between the various devices. Still further, each assembly step need not involve both the selection of a part and the assembly of the part to a work piece.

Operational guide systems may also be incorporated into assembly line systems with the guide systems simultaneously moving along with the item or device being assembled or constructed on the assembly line.

The operational guide system may also be configured for use with a stand alone work station as opposed to a work station integrated into an assembly line as shown in FIG. 1.

It should also be appreciated that numerous alternative uses and/or configurations of the operational guide system exist. For example, an operational guide system may be used to pick and package products into a shipping container, such as a bag or box, for fulfilling an order, such as part kitting at order fulfillment centers, supermarkets, part bin loading, assembly line sequencing, product changeovers, or the like. The operational guide system may also be used in a food production or preparation process in which, for example, the indicating lights may be projected onto sequentially required ingredients and may be timed depending upon when a particular ingredient is to be added.

Figure 3:
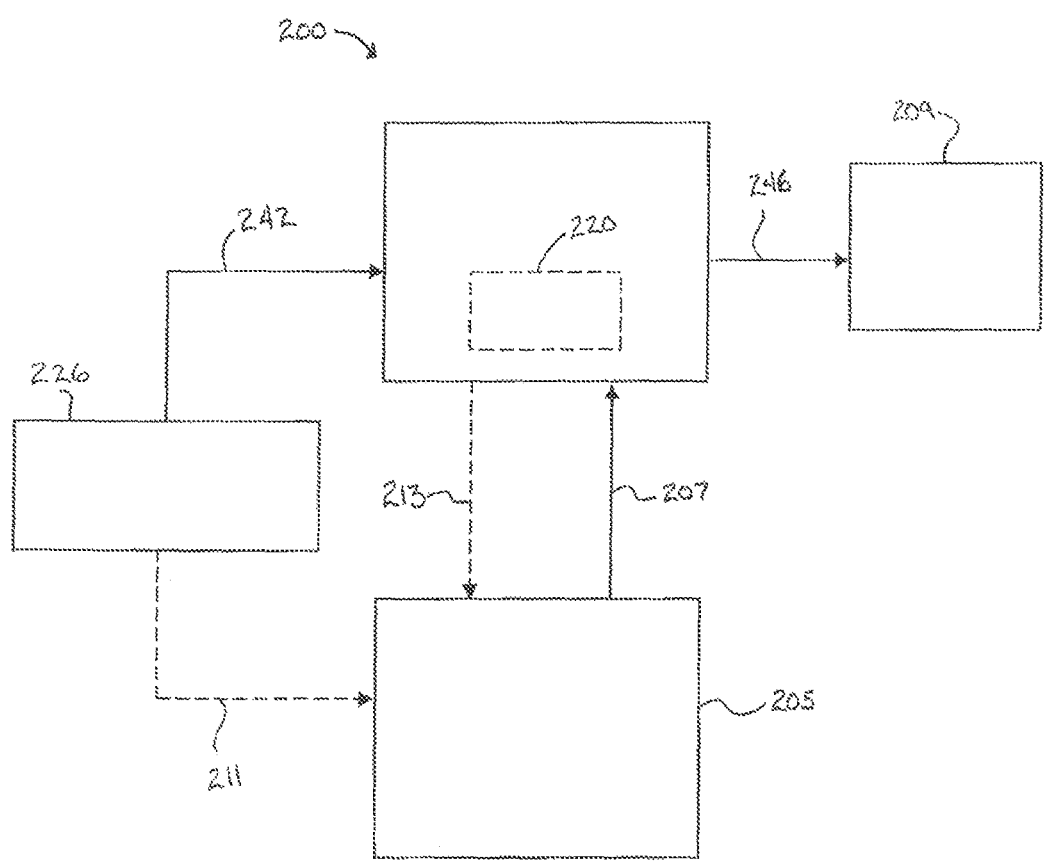
FIG. 3 is a schematic illustration of an alternative operational guide system in accordance with the present invention interfaced with a manufacturing execution system.

FIG. 3 discloses an improved operational guide system 200, where guide system 200 shares similar components or elements with guide system 10, such that not all of the specific construction and alternatives are discussed with regard to guide system 200. Guide system 200 is integrated or interfaced with an operational program system or operational software system or manufacturing execution system (MES) 205 whereby operational software system 205 may provide operational guide system 200 with input signals or data inputs 207 to create, control or cause the projector of operational guide system 200 to project specific display images 209 via the projected indicating light 252 and/or project in specific locations. Manufacturing, production, and/or assembly environments frequently employ operational software systems 205, which are sometimes referred to as enterprise resource planning (ERP) systems, used in association with product planning, production scheduling, inventory control, and the like. These systems are generally defined as control systems for managing and monitoring work-in-process in a factory environment, such as on a factory floor. Examples of such operational software systems include, but are not limited to, SAP® business software provided by SAP AG of Germany, PROPLANNER® business software provided by Proplanner Corp. of Iowa, USA, as well as systems such as General Motor Corporation's Global Enterprise Production Information and Control System (GEPICS). Such operational software systems 205 can include data that may be utilized by guide system 200 to assist in guiding the activities of an individual without the necessity of having such information separately programmed or pre-programmed into guide system 200. For example, operational software system 205 may include part or component information, such as bill of material (BOM) information, including information categorized by part or product for separate operational steps in an assembly operation or the like, including part numbers and/or part descriptors, that may be transmitted to guide system 200. Operational software system 205 may also include ordered operational process descriptions as used, for example, for time and cost analysis purposes, which information may also be transmitted to guide system 200. Operational software system 205 may still further include images of parts, components, decals, labels and the like that may be transmitted to guide system 200.

Accordingly, operational software system 205 may be interfaced with operational guide system 200 as shown in FIG. 3 whereby the data transmitted by operational software system 205 may be directly projected by guide system 200 or used in combination with information programmed into guide system 200 to project indicating lights 246 to create desired images 209. Data inputs 207 transmitted by operational software system 205, such as to a control module or controller or guide controller 220 of guide system 200, may be used to create numerous display images 209, including part numbers, part descriptions, work instructions and/or graphics, such as images of parts, decals, or label. As discussed above with regard to the embodiment of FIG. 1, controller 220 includes software for controlling operation of guide system 200, with controller 220 receiving inputs from operational software system 205 directing use and placement of VDFs. For example, data inputs 207 transmitted from operational software system 205 related to part information may be projected or used by guide system 200 to project a particular part number for display to an operator and/or may trigger guide system 200 to project a display image at a particular location wherein a desired part is stored. Data inputs 207 from operational software system 205 related to sequential operational process descriptors may be projected or used to project step-by-step work instructions to an operator for accomplishing a particular task. Graphical data inputs 207 from operational software system may be projected or used by guide system 200 to project a depiction of a part, label, or decal, which may, for example, be displayed to help an individual correctly identify and/or position a particular item. Moreover, the data inputs 207 from operational software 205 may be used and projected with or combined with standard or programmed images, such as images illustrated in FIGS. 1A-1L.

Figure 3A:
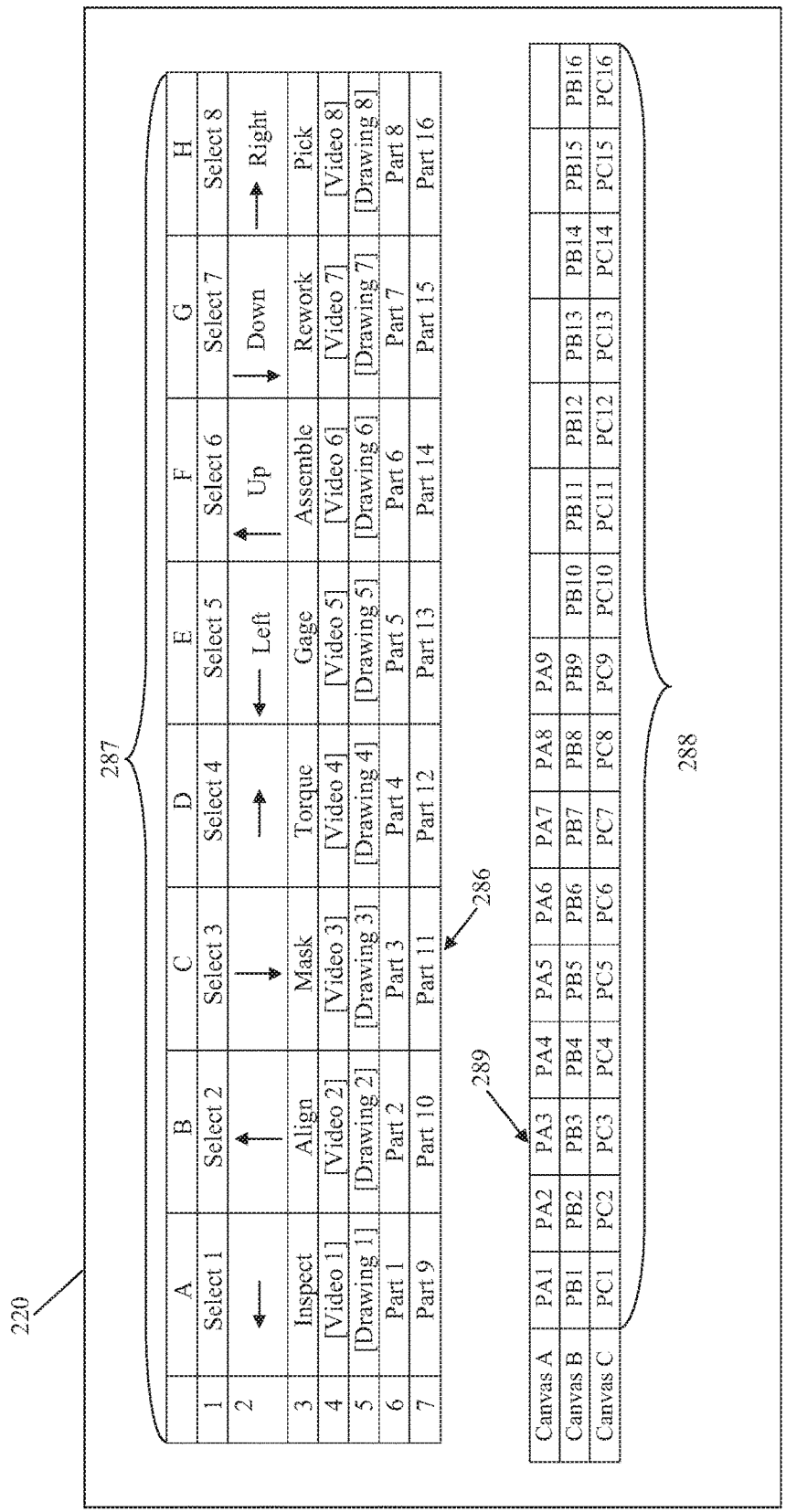
FIG. 3A is a schematic illustration of a guide system controller of the guide system of FIG. 3 including a programmed addressed visual display features and a matrix of positional identifiers.

Referring now to FIG. 3A in connection with the operation of guide system 200, controller 220 is illustrated to include a VDF address table or listing 286, as well as numerous positional identifiers 288 contained in an address table or matrix or positional listing 289. Controller 220 includes numerous pre-programmed VDFs that are each assigned a unique identifier 287, which in the illustrated embodiment for exemplary purposes comprises a horizontal axes with letters "A" to "H" and a vertical axes with the numerals "1" to "7". For example, the textual VDF "Select 1" is associated with the address identifier A1, and the textual VDF "Part 6" is associated with the address identifier F6. In addition to textual VDFs, VDF address table 286 includes images (see A2 to H2), videos (see A4 to H4), and drawings (see A5 to H5). The videos and drawings in FIG. 3A are identified with brackets for explanation purposes, but should be understood that when projected, such as by a projector 266, would form a visual indicator comprising an image, video or drawing, such as a picture or blueprint, on the projection surface. Each unique VDF contains unique characteristic and combination of characteristics including, but not limited to, color, font size, font type, width, height, rotation angle, animation type, alphanumeric code, etc.

In the illustrated embodiment positional listing 289 includes positional identifiers or addresses 288 associated with three separate physical objects, with the objects being identified or represented within positional listing 289 of controller 220 as canvas A, canvas B and canvas C. As shown in the illustrated embodiment, canvas A is associated with positional identifiers PA1 to PA9, canvas B is associated with positional identifiers PB1 to PB16, and canvas C is associated with positional identifiers PC1 to PC16. As described in more detail below, in the illustrated embodiment guide system 200 includes three projectors 266a, 266b, 266c, with each projector being used to project light to form VDFs on the three separate physical objects. The various positional identifiers 288 in listing 289, therefore, represent a location, such as by X, Y, Z spatial coordinates, on the physical object to which a projector and VDFs would be directed. Accordingly, controller 220 is programmed with the locations of nine positions on the physical object associated with canvas A (PA1 to PA9), with the locations of sixteen positions on the physical object associated with canvas B (PB1 to PB16), and with the locations of sixteen positions on the physical object associated with canvas C (PC1 to PC16). Guide system 200 may be taught the positional identifiers in any of the manners discussed above, for example, or utilizing other techniques. Furthermore, multiple projectors may be utilized for each physical object as necessary, with each projector responsible for a specific canvas, or area on the object, and associated positional identifiers.

Figure 3B:
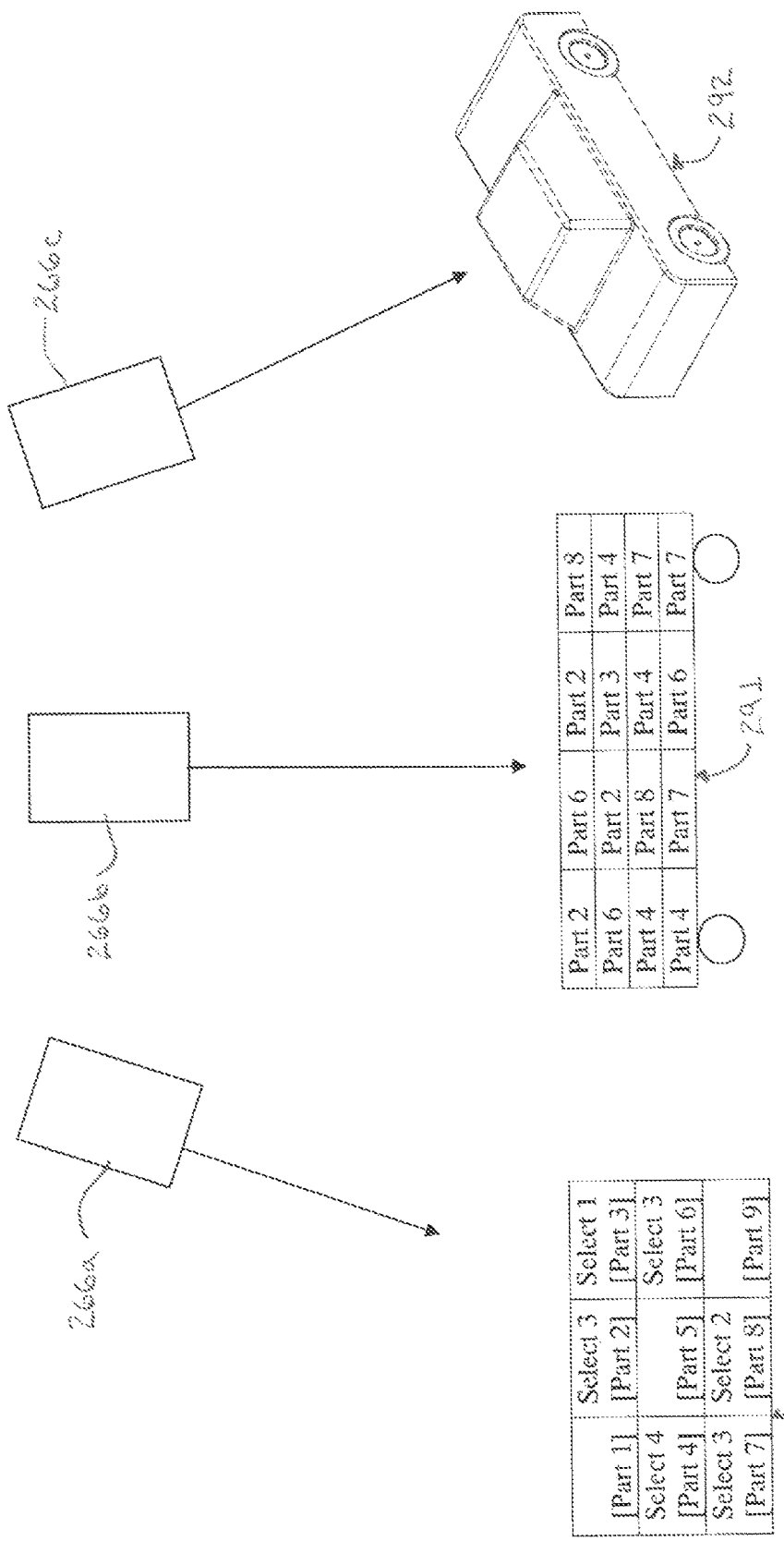
FIG. 3B is a schematic illustration of projectors of the guide system of FIG. 3 projecting visual indicators onto objects corresponding to the addressed visual display features and positional identifiers of FIG. 3A.

With reference to the embodiment of FIG. 3B, three separate physical objects are disclosed, including a parts rack 290, a movable sequence rack 291 that is used to transport parts between parts rack 290 and a vehicle 292, such as may be located on an assembly line. With reference to FIG. 3A, parts rack 290 is the physical object associated with canvas A, sequence rack 291 is the physical object associated with canvas B, and vehicle 292 is the physical object associated with canvas C. Further, projector 266a is utilized to project VDFs onto parts rack 290, projector 266b is utilized to project VDFs onto sequence rack 291, and projector 266c is utilized to project VDFs onto vehicle 292. Parts rack 290 contains nine separate parts bins for containing different parts, with each bin labeled in brackets in FIG. 3B as Part 1 to Part 9 for explanation purposes. It should be understood that this bracketed labeling does not represent the projection of a VDF onto parts rack. Sequence rack 291 includes sixteen separate storage locations within which parts may be stored for sequential assembly to vehicle during assembly. Moreover, the nine positional identifiers PA1 to PA9 associated with canvas A correspond to the physical location of each of the nine separate parts bins of parts rack, and the sixteen positional identifiers PB1 to PB16 associated with canvas B correspond to the physical location of each of the sixteen storage locations of sequence rack.

Thus, in operation, guide system 200 may be prompted to project a particular VDF based on an address identifier 287 onto a surface of a particular object based on a positional identifier 288, with the projected VDF thereby forming a visual indicator on the object. With reference to the embodiment of FIG. 3B, for example, the VDF "Select 3" of address identifier C1 is projected by projector 266a onto parts rack at positional locations associated with the positional identifiers of PA2, PA3 and PA7 to prompt an operator to select three of each of Part 2, Part 6 and Part 7, respectively. Likewise, the VDF "Select 1" of address identifier A1 is projected by projector 266a onto parts rack at the positional location associated with the positional identifier of PA3 to prompt an operator to select a single one of Part 3.

Subsequent to the selection of a particular part, an operator may be prompted to place the selected part into particular storage locations on sequence rack 291. For example, the VDF "Part 2" of address identifier B6 is projected by projector 266b onto storage locations on sequence rack at the positional locations associated with the positional identifiers of PB1, PB3 and PB6 to create visual indicators and prompt the operator to place one each of the three selected Part 2 type of part into the three separate indicated storage locations. Similarly, the VDF "Part 3" of address identifier C6 is projected by projector 266b onto the storage location of sequence rack 291 at the positional location associated with the positional identifier PB7 to prompt the operator to place the selected Part 3 type of part into the indicated storage location.

Still further, guide system 200 may subsequently be utilized to aid in the assembly of the parts placed within sequence rack 291 onto vehicle 292, as well as perform additional assembly operations on vehicle 291. For example, VDFs associated with address identifiers B6, C6, D6, F6, G6 and H6 may be projected by projector 266c onto specific locations on vehicle 292 where at the particular selected part is to be assembled in the sequence associated with their storage on sequence rack, with the positional locations for assembly to vehicle 292 being defined by the positional identifiers PC1 to PC16. Still further, additional VDFs may be projected onto vehicle 292, such as are listed as A3 to F3 in VDF address table 286, for example, to direct inspection, alignment, masking or other such operations.

It should be appreciated that confirmation signals may be provided with regard to verification that the various activities undertaken by an operator as prompted by guide system 200 were properly completed, such as in the manner disclosed above with respect to guide system 10, such as by a confirmation module. For example, parts rack 290 and/or sequence rack 291 may provide confirmation signals by way of machine vision systems, light curtains, push buttons, as well as spatial recognition systems. Similarly, operations associated with vehicle 292 may similarly be confirmed.

Accordingly, guide system 200 may be dynamically used to project selected VDFs onto particular locations of an object by selecting a VDF via its associated VDF address identifier 287 and directing a projector 266 to project the selected VDF by a positional identifier 288. This operational approach simplifies the use and employment of guide system 200 by enabling flexible programming to guide system 200, including as may be required due to product and model changes.

Figure 3C:
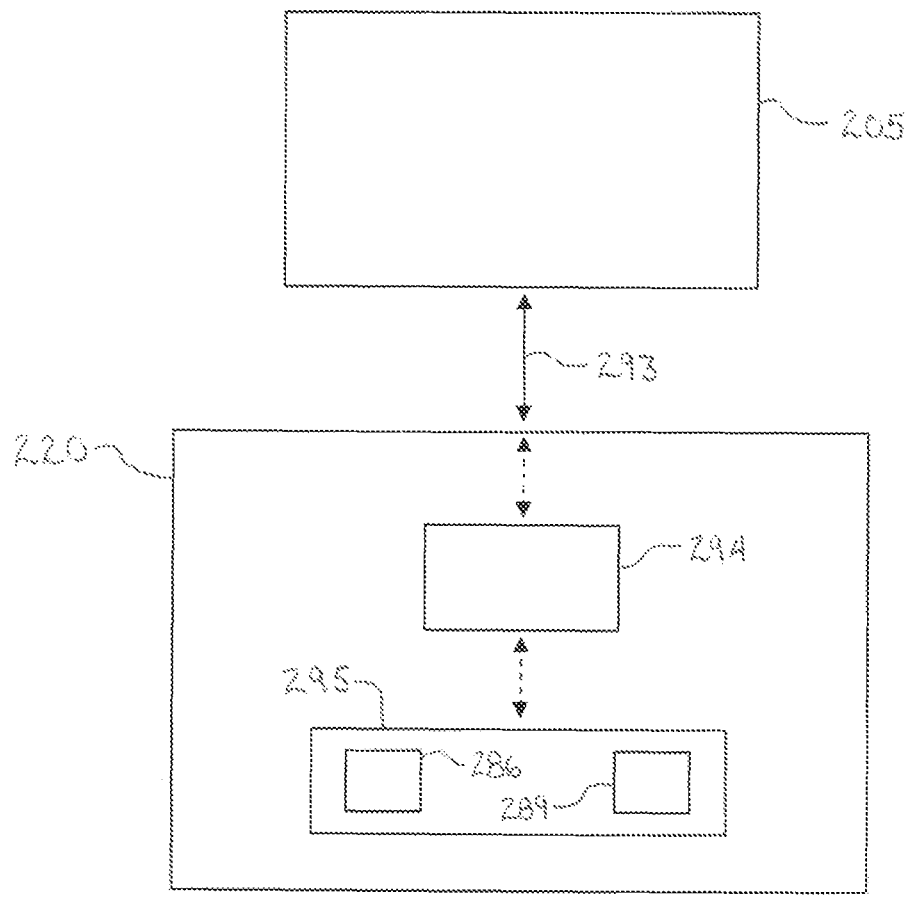
FIG. 3C is a schematic illustration of the interfacing of the manufacturing execution system and guide system of FIG. 3.

In the embodiment of FIG. 3, data inputs 207 are employed to coordinate the selection of VDFs based on the associated address identifier, as well as the positional location of where the VDF is to be projected based on the positional identifier. Referring now to FIG. 3C, the interface of operational software 205 with the controller 220 of guide system 200 is illustrated. A communication link 293 between system 205 and controller 220 is used for the exchange of data, with communication link 293 comprising a standard communication protocol such as TCP/IP or the like. Controller 220, which includes hardware and software, includes an application program 294 for interfacing with the operational software 205, where application program 294 may be customized based on the specific type or program of operational system 205 employed. Also included is a guide system program 295, with guide system program 295 including the above noted address table 286 and positional listing 289. In one embodiment application program 294 and guide system program 295 may interact via an application programming interface (API) such as Windows Communication Foundation (WCF). Accordingly, guide system program 295 of guide system 200 can be utilized with multiple different operational software systems 205 based on the customization of application program 294 for the particular operational software system 205 employed. Data inputs or signals to controller 220, such as signals representing part numbers, product model numbers, operational steps, and the like, are interpreted by controller 220 via application program 294 and guide system program 295 to cause the proper selection of a VDF based on the address identifier and project it at the appropriate location based on the positional identifier.

As previously noted, operational systems 205 may include detailed information regarding production processes, including the location and status of particular objects being assembled, as well as the parts required to be assembled. For example, operational software systems 205 can track the model and location of a vehicle on an assembly line and thereby interact with guide system 200 in the manner described above to coordinate the providing of the appropriate components and assembly actions. Thus, operational software system 205 may provide data streams of input signals 207 to guide system 200 to enable desired VDFs to be projected at desired locations. Interfacing guide system 200 with operational software system 205 reduces the amount of separate programming required for guide system 200, as well as enables real time or dynamic creation of visual indicators or display images 209 for guiding the activities of an individual. Thus increasing the flexibility of guide system 200 based on changing operational requirements of an assembly, inspection or other process requiring guidance assistance via guide system 200.

With further reference to FIG. 3, a sensor apparatus 226 may be provided, such as sensor apparatus 26 described above in reference to FIGS. 1 and 2, that may be used for triggering or sending data inputs to guide system 200 for part selection and/or confirmation. For example, upon activation of guide system 200 to perform a particular guidance procedure based on detection of a component or required assembly or inspection steps, sensor apparatus 226 may transmit a signal 211 to operational software system 205 identifying the particular component or required assembly steps pending at guide system 200. Operational software system 205 may then transmit data inputs 207 based on signal 211. Alternatively, in response to an input signal 242 transmitted by sensor apparatus 220 to guide system 200, such as to a control module of guide system 200, guide system 200 may send a signal 213 to operational software system 205 triggering the transmission of data inputs 207 to guide system 200 based on the particular component or required assembly or inspection steps pending at guide system 200. Still further, operational software system 205 and guide system 200 may be integrated or interfaced in such a manner that data within operational software system 205 is provided to or resides within guide system 200 without the need for triggering signals. As noted, sensor apparatus 226 may be a sensor apparatus component of guide system 200. Alternatively, sensor apparatus 226 may be a separate component, such as a device that detects the presence and/or type of product at guide system 200, or may be a device such as a computer for allowing manual inputs.

Although described above in regard to the assembly of a vehicle, it should be appreciated that guide system 200 may be employed with numerous alternative processes, including assembly, inspection, sequencing, product changeover, welding, stamping, part kitting, and the like. Moreover, the guide system may include fewer or substantially more VDFs, with each having its own address identifier, as well as include additional positional identifiers. It should be further understood that numerous alternative VDFs may be employed, as well as that multiple VDFs may be simultaneously projected or projected sequentially as desired. For example, a VDF may be projected to form a visual indicator that traces a route along an object, as well as traces a route along an object at a particular speed. Such a visual indicator may be used, for example, to aid in the application of an adhesive onto the object by enabling an operator to follow the indicator to place the adhesive in the appropriate location, as well as in the proper amount based on the speed of the projected visual indicator. Still further, a guide system may include fewer or more projectors and/or enable a single projector to project onto multiple physical objects.

Although shown in connection with an operational software system in FIGS. 3 and 3C, it should be further appreciated that guide system 200 may be employed utilizing an addressed VDF listing 286 and positional identifiers 288 without an operational software system 205 and/or without a system controller as described below. In such embodiments, guide system controller 220 may be programmed by selecting VDFs to be projected based on the VDF address identifiers and the positional identifiers corresponding to the locations on a physical object, thereby providing substantial flexibility to the programming of guide system controller 220. In such an embodiment, guide system controller 220 may receive input signals directly from a sensor apparatus and/or via manual inputs from an operator.

Figure 3D:
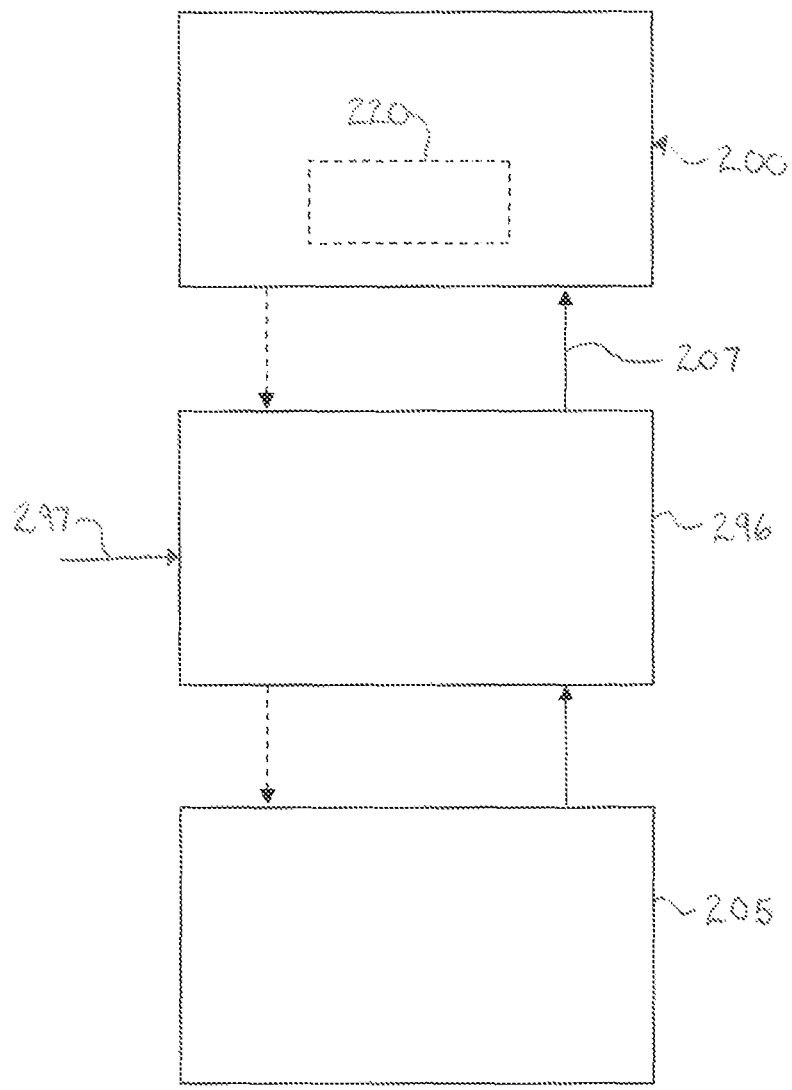
FIG. 3D is a schematic illustration of a guide system interfaced with a system controller of an automated process, and of a manufacturing execution system interfaced with the system controller.

Still further, as illustrated in FIG. 3D, guide system controller 220 may be configured for operations through a system controller 296, such as a PLC device, where the system controller 296 may operate to control an automated process, such as an assembly line 18, and provide input signals 207 to controller 220. In such an arrangement system controller 296 may communicate with controller 220 via an I/O fieldbus interface. For example, system controller 296 may receive signals 297 from a sensor apparatus, such as a bar code reader or the like, as described above in connection with system 10, and in turn provide an input signal 207 to guide system controller 220 to prompt the projection of a VDF based on an address identifier 287, at a particular physical location based on a positional identifier 288. It should be appreciated that application program 294 and/or guide system 295 may operate to parse or interpret the data inputs 207 to prompt selection of the appropriate address identifier and positional indicator. An alternative system controller may be employed comprising a software system, such as a soft-PLC or visual logic controller (VLC) software, or the like for example, in which case a hardware system employed with a conventional PLC device may not be required. In such a software based application the system controller may reside and operate on the guide system controller 220.

In turn, as illustrated in FIG. 3D, an operational software system 205 may provide communications to a system controller 296 that is utilized to control operation of an automated process, such as assembly line 18, as well as guide system 200. It should be appreciated with respect to FIG. 3D, however, that guide system 200 may be controlled and interact with system controller 296 without utilizing an operational software system 205. For example, system controller 296 may receive signals 297 with regard to an operational process, such as via a bar code or data reader or other such sensor, with the PLC in turn providing input signals 207 to guide system controller 220 of guide system 200 based on such signals, and with the input signals 207 being parsed or interpreted by the guide system control 220 to define the appropriate addressed VDF and positional identifier.

Figure 3E:
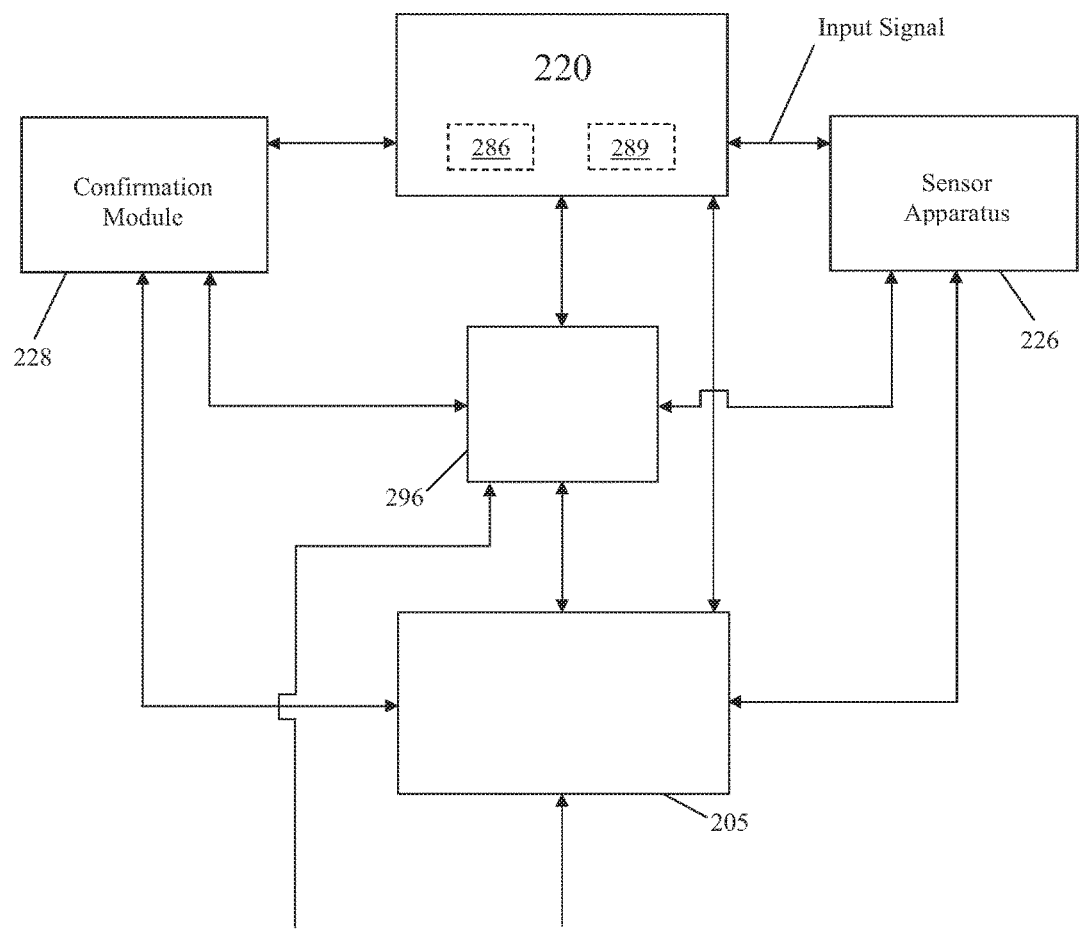
FIG. 3E schematically illustrates various alternatives by which a guide system controller may receive input signals and confirmation signals.

Thus, it should be understood that guide system controller 220 of guide system 200 may receive input signals triggering the selection of address identified VDFs and positional identifiers for directing the projection of the selected VDFs onto a desired location of a physical object from a variety of equipment, controllers and systems. For example, the input signals may be provided to the controller 220 directly from an operational system 205, where the operational system 205 may itself receive signals from a sensor apparatus 226 and the input signal provided by the operational system 205 are based on the signals received by the operational system 205 from the sensor apparatus 226. Input signals triggering such projection by guide system 200 may also or alternatively be provided directly to guide system controller 220 by a sensor apparatus 226. Still further, a system controller 296 may provide input signals triggering projection, including via the system controller 296 receiving signals from a sensor apparatus 226. It should further be appreciated that in like manner to system 10, guide system 200, including whether used as a stand alone system or in connection with a system controller 296 and/or a manufacturing execution system 205, may receive confirmation signals upon completion of an activity directed by a projected visual indicator, such as via the above noted techniques, including via a confirmation module 228. That is, confirmation signals may be provided directly to guide system controller 220, such as via a confirmation module 228 and/or confirmation signals may be provided to guide system controller 228 from a system controller 296 and/or an operational system 205. These various alternatives regarding input signals, confirmation signals, a sensor apparatus 226, and a confirmation module 228 are schematically illustrated in FIG. 3E, wherein it should be appreciated that the system controller 296 and/or operational system 205 may be omitted.

Figure 4:
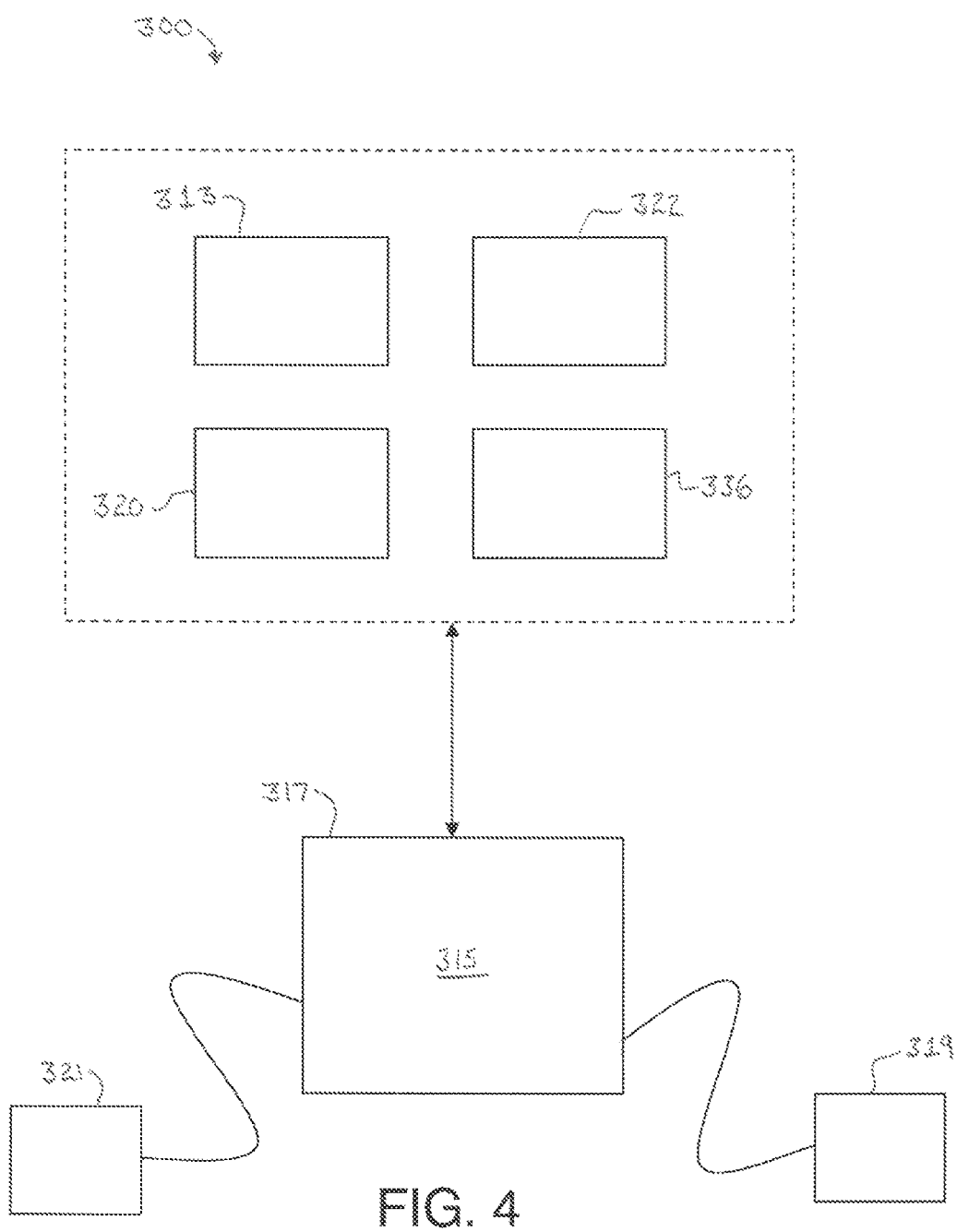
FIG. 4 is a schematic illustration of an alternative operational guide system in accordance with the present invention incorporating a camera device.

Referring now to FIG. 4, an operational guide system 300 is illustrated, where guide system 300 shares similar components or elements with guide system 10, such that not all of the specific construction and alternatives are discussed with regard to guide system 300. Guide system 300 includes an integrated camera device 313 that may be used to record and/or review activities by an individual being guided by guide system 300, as well as the object that is the subject of activities by the individual. Camera 313 may be a digital camera for still pictures or a video recorder, such as a webcam or a high definition video camera recorder, including a video camera capable of capturing still images. Images or videos captured by camera 313 may be recorded or stored in guide system 300 and subsequently viewed on a display device 336 of guide system 300 and/or on a separate display device remote from guide system 300, such as via a computer network. Such images or videos may be used for numerous process analysis purposes, including to develop process improvements, such as facilitating assembly steps, determine or investigate why certain operational steps exceeded a desired cycle time, and monitor causes of downtime. Images recorded by camera 313 may also be viewed in combination with recorded cycle time data to review the recorded process steps and determine corrective actions to optimize the process and/or reduce cycle times.

Still further, recorded and/or real time images from camera 313 may be viewed remotely from guide system 300, such as by interfacing guide system 300 with a monitor 315, where monitor may be (part of) a computer 317, for example, integrated with guide system 300 through an intranet or internet connection, including via a wireless connection. Computer 317 may also be used to control various aspects of guide system 300, including camera 313 and a directional light device 322 having a projecting light source. For example, in one scenario guide system 300 may be used as part of a remote training session whereby a trainer remotely located from guide system 300 may train one or more students at a remote training station utilizing guide system 300. In such a scenario, the surgeon may view with computer 317 the object being worked on by the students via camera 313. The trainer may then control directional light device 322 by a light controller 319, such as a joystick, to project an indicating light onto a particular location of the object at the training station for directing activities of the students. In such an embodiment, guide system 300 may also include a camera controller 321, such as a separate joystick or the like, whereby the surgeon may also control aspects of the camera 313, such as the camera's viewing position, focus, and zoom. Although light controller 319 and camera controller 321 are illustrated as separate components, it should be understood that computer 317 may be used to control the directional light device and/or camera 313 without separate components. In another scenario, camera 313 may be used by a technician or engineer during programming of guide system 300, such as to program a new assembly step whereby the camera 313 would allow the programmer to view, for example, the work station and any associated part bins and properly direct the projection of an indicating light by directional light device 322.

Camera 313 may be a separately mounted camera, such as at a fixed position or mounted for movement, such as by servo motors. Still further, camera 313 may be integrated with the directional light projecting devices.

Figure 5A:
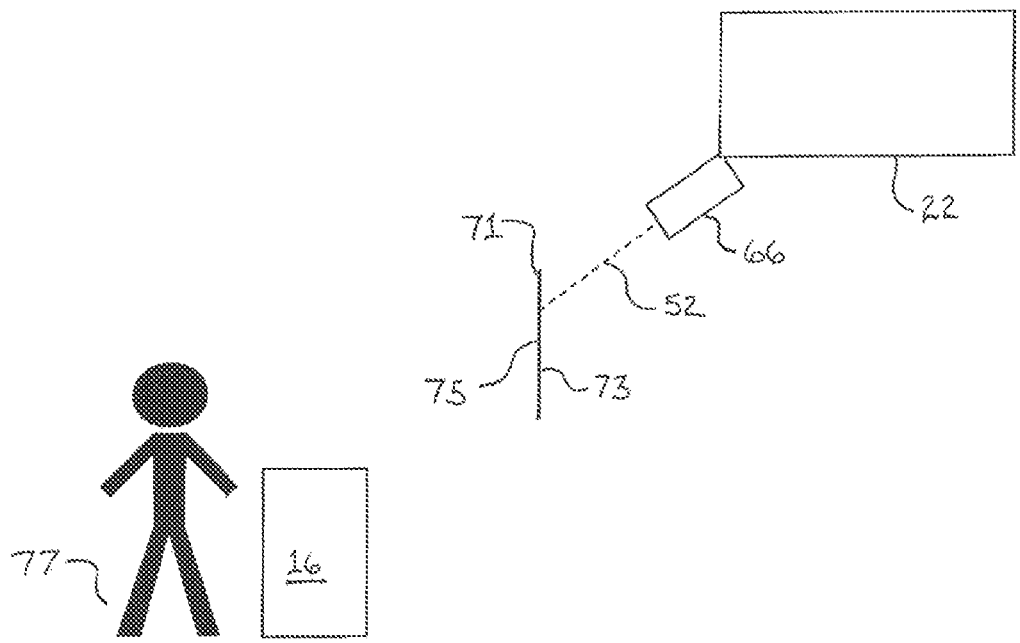
FIGS. 5A-5C schematically illustrate a projection surface that may be incorporated with an operational guide system in accordance with the present invention.
Figure 5B:
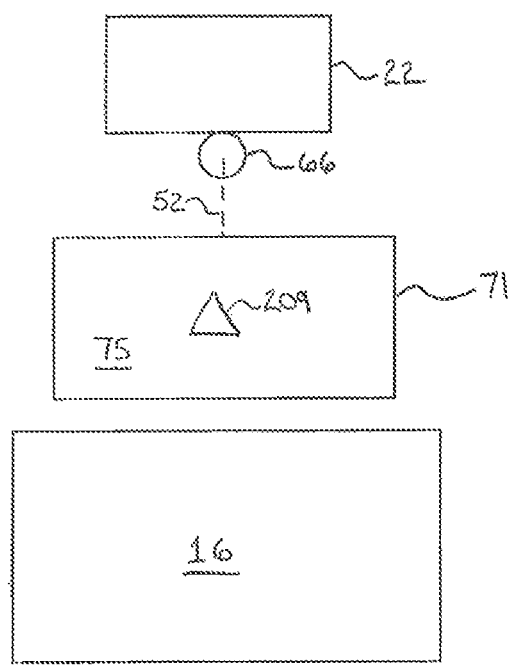

Referring now to FIGS. 5A and 5B, a directional light device 22 having a light projector 66 is illustrated relative to work station 16, such as shown with reference to operational guide system 10 and work station 16 of FIG. 1, where indicating lights projected by the light device 22 are directed at a projection surface or screen 71. Projection surface 71 allows individuals to view display images 209 projected onto surface 71 when the individuals are located on the opposite side of projection surface 71, such as when an individual is standing at work area 77, relative to directional light device 22 and may be utilized, for example, in locations in which a light projector is constrained from projecting indicating lights without being blocked by an operator or additional equipment or by components located at the work station. Images 209 projected onto a back surface or rear surface 73 of projection surface 71 are viewable by an operator stationed at work station 16 when the operator views the front surface 75 of projection surface 71 such that the operator may see and read display images 209, such as words, pictures, or videos, for guiding activities at work station. Projection surface 71 may be constructed from a conventional rear projection screen.

Figure 5C:
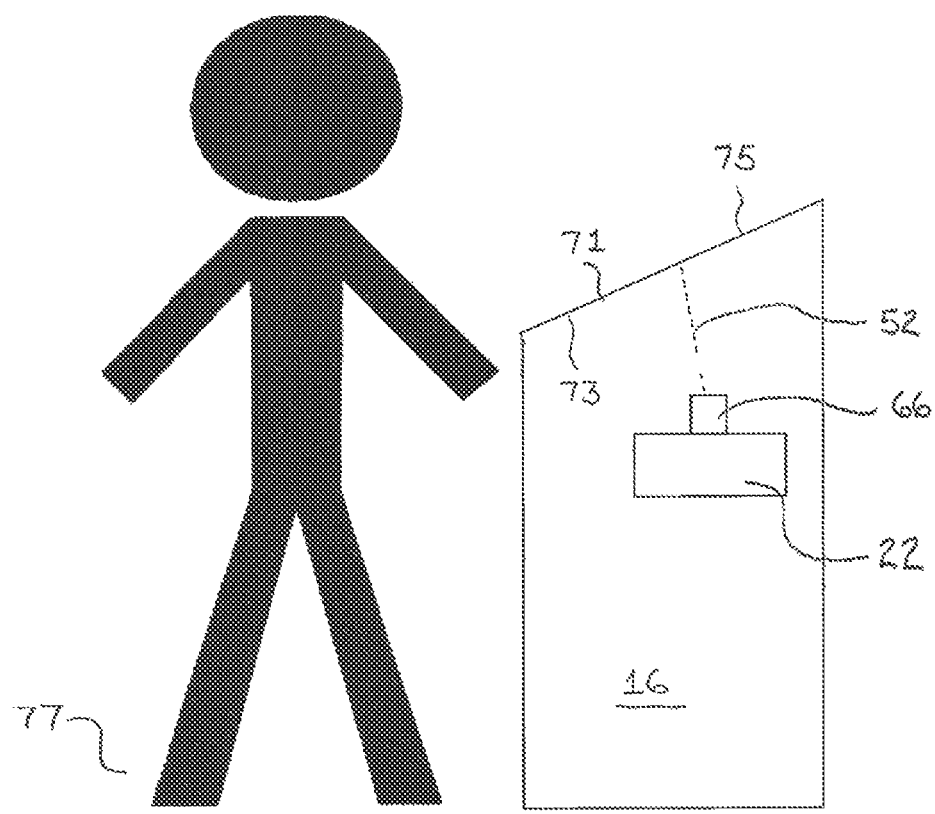

FIG. 5C illustrates an alternative embodiment in which projection surface 71 is mounted to work station 16 with light device 22 and light projector 66 mounted from beneath. In the embodiment of FIG. 5C, an operator stationed at work station 16 views on front surface 75 display images 209 projected on back surface 73. As illustrated, projection surface 71 may be angled or angularly inclined, such as in the range of approximately 20 to 25 degrees relative to a horizontal plane, for ease of viewing by the operator.

Although projection surface 71 described above is constructed as a rear projection screen, it should be appreciated that in an alternative embodiment a projection surface may be employed in which a directional light projection device projects images directly onto the surface viewed by an individual as opposed to the rear surface. In such an embodiment, the directional light projection device may be located above or to the side of the individual being guided.

Figure 6:
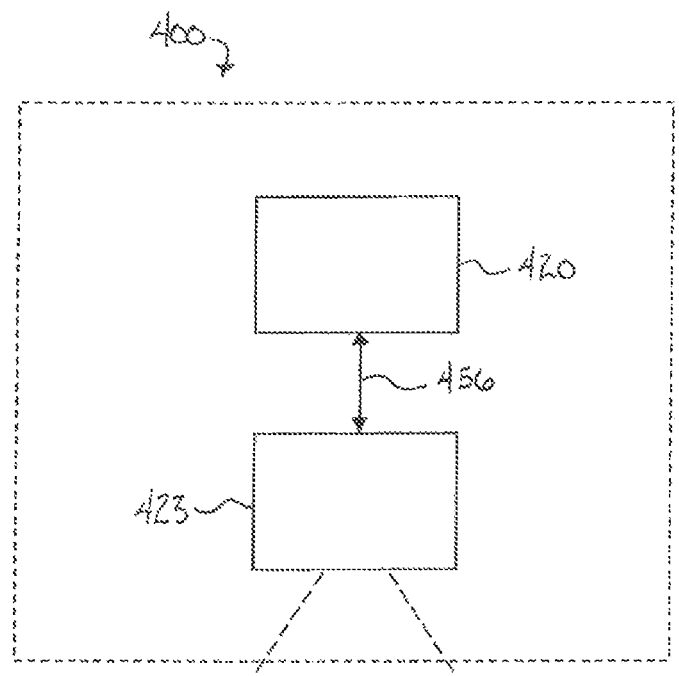
FIG. 6 is a schematic illustration of an alternative operational guide system in accordance with the present invention incorporating a three dimensional spatial motion sensor.
Figure 6:
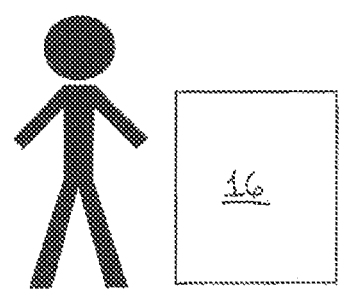

With reference to FIG. 6, an operational guide system 400 may also be constructed to include one or more three dimensional spatial motion sensors 423 for monitoring activities of an operators body, hand, etc. and/or other surfaces related to robots, workstation hardware such as fixtures, part bins, etc. to confirm that desired operational steps are properly accomplished. Sensor 423 may, for example, be used to or as part of monitoring that particular parts were properly selected from the correct bins and placed for part kitting purposes or assembled to a work piece. Sensor 423 may additionally function as a confirmation module, such as confirmation module 28 discussed above, to provide output confirmation signals 456 comprising data related to the detected motion sensed by sensor 423, such as to guide controller or guide control module 420, where the detected motion data may be compared to predetermined required motions or actions to thereby aid in indicating or determining that the operational step indicated by the directional light device of guide system 400 has been properly completed. Alternatively, motion sensor 423 may itself include processing capability for comparing detected motion to a predetermined desired action to thereby provide a confirmation signal 456 if the guided action has been properly completed. In situations where the motion detected by sensor 423 does not match a predetermined action a signal may be transmitted, such as by a guide system controller or the sensor itself, indicating as such.

Sensor 423 may, for example, employ Microsoft Corporation's KINECT three dimensional spatial motion sensor technology, which utilizes a three dimensional infrared laser projector and a monochrome CMOS sensor for analyzing depth, as well as a separate RGB video camera. Details of such technology may be disclosed in U.S. Pat. No. 7,763,841 titled OPTICAL COMPONENT FOR A DEPTH SENSOR and U.S. Pat. No. 6,963,060 titled PHOTO-SENSOR ARRAY FOR MOTION DETECTION, the disclosures of which are incorporated herein by reference. However, it should be understood that alternative three dimensional spatial motion sensor technology may be employed with sensor 423. Still further, sensor 423 may include a camera that is additionally utilized to record and/or review activities by an individual being guided by guide system, such as camera 313 of guide system 300 of FIG. 7. Accordingly, it should be appreciated that the sensor 423 of guide system may be used for process analysis purposes, remote user interface and/or programming purposes, as well as for confirmation of proper completion of guided operations.

Figure 7:
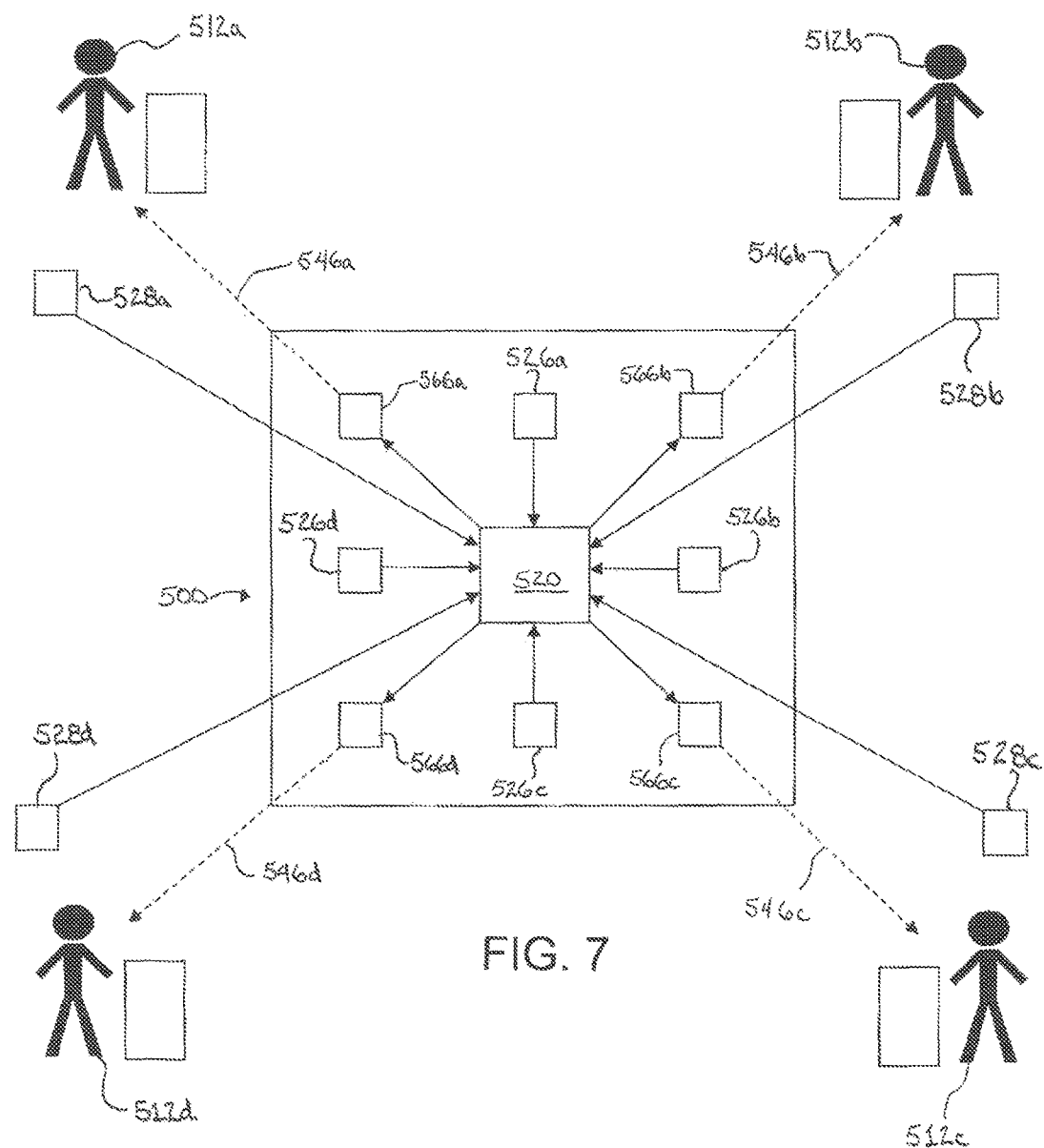
FIG. 7 is a schematic illustration of an operational guide system in accordance with the present invention in operation simultaneously guiding activities of multiple individuals.

FIG. 7 illustrates an operational guide system 500, which may be any of guide systems 10, 200, 300 or 400 described above, in operation simultaneously providing indicating lights to guide activities of multiple individuals 512a, 512b, 512c, 512d. As illustrated, guide system 500 includes a single controller 520 with multiple projectors 566a, 566b, 566c, 566d and multiple sensor apparatuses 526a, 526b, 526c, 526d. Each projector 566 may be used to guide one or more actions by a separate individual 512, where the actions for each individual 512 may be guided completely separate or independently of the guiding of actions for the other individuals. For example, if each individual 512 is performing the same task, but each individual performs the task at a different rate, guide system 500 can accommodate such variation and allow each individual to initiate, perform, and finalize their activities separately from one another. Alternatively, one or more of the individuals 512 may be directed by guide system 500 to perform separate tasks requiring different guided activities that may be initiated, performed, and completed independently from the guided activities for the other individuals. Accordingly, operational guide system 500 may be provided with, as shown, separate sensor apparatuses 526a, 526b, 526c, 526d and/or confirmation modules 528a, 528b, 528c, 528d associated with each individual 512a, 512b, 512c, 512d, respectively. Furthermore, these system improvements may also be used by guide system 500 to project the VDFs required to guide process steps for multiple individuals from one projector rather than multiple projectors.

Operational guide systems 200, 300 and 400 of FIGS. 3-6 may be similarly constructed to operational guide system 10 discussed above, with similar components to operational guide system 10 being identified with 200, 300 and 400 added to the reference numerals of guide system 10, and such that not all of the details of similar features are discussed with reference to guide systems 200, 300 and 400.

In addition, guide systems in accordance with the present invention may include a conditional programming methodology whereby the guide system controller enables and/or provides a user, system controller, or manufacturing execution system to re-direct the guide system based on a signal received by the guide system controller. For example, if a sensor apparatus detects that a guided operation was missed or not done properly, the guide system may provide specific remedial guidance based on that detection. Examples include, but are not limited to, rework requirements, help information, and missing parts options. If, for example, a vision system sensor detects that a part is missing or a gauge tool sensor detects that a part is out of specification, guide system may provide remedial guided actions to correct the error.

The guide system of the present invention thus is readily programmable and adaptable to provide a cost effective and accurate method of guiding an individual through a series of tasks and/or provide confirmation that the tasks have been properly completed.

Changes and modifications in the specifically described embodiments can be carried out without departing from the principles of the present invention which is intended to be limited only by the scope of the appended claims, as interpreted according to the principles of patent law including the doctrine of equivalents.

The embodiments of the invention in which an exclusive property or privilege is claimed are defined as follows:

1. A method of projecting visual indicators to guide actions of an individual for a particular guided operation, said method comprising:
   projecting a visual indicator using a directional light device onto a physical object associated with the particular guided operation;
   imaging the projected visual indicator with a camera located proximate to the directional light device;
   transmitting images from the camera to a monitor located remotely from the directional light device; and
   displaying images from the camera on the monitor;
   wherein said imaging, by the camera, captures images of at least the individual being guided, the physical object and the projected visual indicator.

2. The method of claim 1, further comprising receiving, by the guide system controller, a sequence of one or more input signals and prompting the directional light device to project the visual indicator for the particular guided operation.

3. The method of claim 2, wherein the sequence of one or more input signals are provided by a separate computer system or controller to the guide system controller.

4. The method of claim 1, further comprising receiving, by the guide system controller, a sequence of input signals and prompting the directional light device to dynamically project a sequence of visual indicators onto the physical object for the particular guided operation based on the sequence of the input signals.

5. The method of claim 4, further comprising receiving, by the guide system controller, a combination of the sequence of the input signals and generation of a dynamic, real-time projection, via the directional light device, of the sequence of said visual indicators.

6. The method of claim 5, wherein the sequence of input signals are provided by a separate computer system or controller to the guide system controller.

7. A guide system adapted to provide visual indicators to an individual to guide actions of the individual for a particular guided operation, said guide system comprising:
   a directional light device, said directional light device being selectively operable to project and target at least one indicating light;
   a guide system controller, said guide system controller being operable to control said directional light device to project a visual indicator with said indicating light onto a physical object associated with the particular guided operation;
   a camera located proximate to said directional light device and configured to capture an image of at least the individual, the physical object and said visual indicator when said visual indicator is projected onto the physical object;
   a monitor, said monitor being remote from said directional light device and said guide system controller, with said monitor being operably interfaced with said camera to display the image captured by said camera.

8. The system of claim 7, wherein said guide system controller is configured to receive a sequence of one or more input signals causing said directional light device to project said visual indicator for the particular guided operation.

9. The system of claim 8, further including a separate computer system or controller and wherein said separate computer system or controller is configured to provide the sequence of one or more input signals to said guide system controller.

10. The system of claim 7, wherein said guide system controller is configured to receive a sequence of input signals and to cause said directional light device to dynamically project a sequence of visual indicators onto the physical object for the particular guided operation based on the sequence of the input signals.

11. The system of claim 10, wherein a combination of the sequence of the input signals results in a generation of a dynamic, real-time projection of the sequence of said visual indicators.

12. The system of claim 11, further including a separate computer system or controller and wherein said separate computer system or controller is configured to provide the sequence of input signals to said guide system controller.

* * * * *